US011509653B2

(12) United States Patent
Faris et al.

(10) Patent No.: US 11,509,653 B2
(45) Date of Patent: Nov. 22, 2022

(54) MULTI-FACTOR AUTHENTICATION AND POST-AUTHENTICATION PROCESSING SYSTEM

(71) Applicant: NIKE, Inc., Beaverton, OR (US)

(72) Inventors: Ron G. Faris, Brooklyn, NY (US); Jett House, New York City, NY (US); Aaron L. Uhrmacher, New York City, NY (US); Michael B. Hailey, Forest Grove, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/129,439

(22) Filed: Sep. 12, 2018

(65) Prior Publication Data

US 2019/0081947 A1    Mar. 14, 2019

Related U.S. Application Data

(60) Provisional application No. 62/557,342, filed on Sep. 12, 2017.

(51) Int. Cl.
*H04L 29/06* (2006.01)
*H04L 9/40* (2022.01)
(Continued)

(52) U.S. Cl.
CPC ....... *H04L 63/0876* (2013.01); *G06Q 30/018* (2013.01); *G06Q 30/0185* (2013.01);
(Continued)

(58) Field of Classification Search
CPC ............................ G06Q 30/06; G06Q 20/3825
See application file for complete search history.

(56) References Cited

U.S. PATENT DOCUMENTS 6,585,622 B1    7/2003    Shum et al.
6,932,698 B2    8/2005    Sprogis
(Continued)

FOREIGN PATENT DOCUMENTS

JP    2008046806 A    2/2008
JP    2012-212225 A    11/2012
(Continued)

OTHER PUBLICATIONS

Nov. 30, 2018—(WO) ISR & WO—App. No. PCT/US18/050497.
(Continued)

*Primary Examiner* — Jason K Gee
(74) *Attorney, Agent, or Firm* — Banner & Witcoff, Ltd.

(57) ABSTRACT

An end-user computing device may utilize an imaging device to capture input from an electronic tag of a physical asset. The end-user computing device may generate supplemental digital data associated with the input. The end-user computing device may transmit the input and the supplemental digital data to an authentication and digital assets server. The authentication and digital assets server may authenticate the physical asset and transmit the authentication results to the end-user computing device, which may display the authentication results. If the authentication of the physical asset is successful, the authentication and digital assets server may select one or more digital assets and transmit the one or more digital assets to the end-user computing device. The end-user computing device may display the one or more digital assets.

18 Claims, 18 Drawing Sheets

(51) Int. Cl.
  *G06Q 30/00*   (2012.01)
  *G06Q 30/02*   (2012.01)
  *G06Q 30/06*   (2012.01)
  *H04N 5/272*   (2006.01)

(52) U.S. Cl.
  CPC ......... *G06Q 30/02* (2013.01); *G06Q 30/0207* (2013.01); *G06Q 30/0609* (2013.01); *G06Q 30/0643* (2013.01); *H04L 63/107* (2013.01); *H04N 5/272* (2013.01)

(56) References Cited

U.S. PATENT DOCUMENTS

| | | |
|---|---|---|
| 7,171,331 B2 | 1/2007 | Vock et al. |
| 8,428,614 B2 | 4/2013 | Wolfe |
| 8,606,645 B1 | 12/2013 | Applefeld |
| 9,058,764 B1 | 6/2015 | Persson et al. |
| 9,131,339 B1 | 9/2015 | Kulfan et al. |
| 9,142,038 B2 | 9/2015 | Lotto |
| 9,223,902 B1 | 12/2015 | McHugh et al. |
| 10,127,725 B2 | 11/2018 | Kohler et al. |
| 10,201,939 B1 | 2/2019 | Pare et al. |
| 10,706,459 B2 | 7/2020 | Faris et al. |
| 2002/0111201 A1 | 8/2002 | Lang |
| 2003/0107178 A1 | 6/2003 | Weston |
| 2004/0024850 A1 | 2/2004 | Miyake |
| 2004/0079797 A1 | 4/2004 | Wadley |
| 2005/0265345 A1* | 12/2005 | Chen .................. H04W 76/15 370/392 |
| 2006/0097847 A1 | 5/2006 | Bervoets et al. |
| 2006/0230640 A1 | 10/2006 | Chen |
| 2006/0293103 A1 | 12/2006 | Mendelsohn |
| 2007/0242066 A1 | 10/2007 | Levy Rosenthal |
| 2008/0009349 A1 | 1/2008 | Wolfe |
| 2008/0167129 A1 | 7/2008 | Aaron et al. |
| 2009/0018911 A1 | 1/2009 | An Chang et al. |
| 2009/0227374 A1 | 9/2009 | Tirpak et al. |
| 2010/0079338 A1 | 4/2010 | Wooden et al. |
| 2011/0105092 A1 | 5/2011 | Felt et al. |
| 2011/0313779 A1 | 12/2011 | Herzog et al. |
| 2012/0010995 A1* | 1/2012 | Skirpa .................. G06F 16/95 705/14.49 |
| 2012/0136998 A1 | 5/2012 | Hough et al. |
| 2012/0180084 A1 | 7/2012 | Huang et al. |
| 2012/0202600 A1 | 8/2012 | Jalili |
| 2012/0212505 A1 | 8/2012 | Burroughs et al. |
| 2012/0225705 A1 | 9/2012 | Rhodes, Jr. |
| 2012/0233076 A1 | 9/2012 | Sutcliffe et al. |
| 2012/0320216 A1 | 12/2012 | Mkrtchyan et al. |
| 2013/0178257 A1 | 7/2013 | Langseth |
| 2013/0211893 A1 | 8/2013 | Bryant et al. |
| 2013/0260727 A1 | 10/2013 | Knudson et al. |
| 2013/0293584 A1 | 11/2013 | Anderson |
| 2014/0025481 A1 | 1/2014 | Kang et al. |
| 2014/0129949 A1 | 5/2014 | Singer |
| 2014/0172640 A1 | 6/2014 | Argue et al. |
| 2014/0176565 A1 | 6/2014 | Adeyoola et al. |
| 2014/0237578 A1 | 8/2014 | Bryant et al. |
| 2014/0253743 A1 | 9/2014 | Loxam et al. |
| 2014/0282974 A1* | 9/2014 | Maher .................. H04L 9/3271 726/7 |
| 2015/0105153 A1* | 4/2015 | Xu .................. A63F 13/798 463/31 |
| 2015/0106195 A1 | 4/2015 | Holman et al. |
| 2015/0109338 A1 | 4/2015 | McKinnon et al. |
| 2015/0140982 A1 | 5/2015 | Postrel |
| 2015/0205894 A1 | 7/2015 | Faris et al. |
| 2015/0206349 A1 | 7/2015 | Rosenthal et al. |
| 2015/0235267 A1 | 8/2015 | Steube et al. |
| 2015/0286897 A1 | 10/2015 | Spaith |
| 2015/0324850 A1 | 11/2015 | Rivera |
| 2015/0348329 A1 | 12/2015 | Carre et al. |
| 2016/0012498 A1 | 1/2016 | Prasad |
| 2016/0070809 A1 | 3/2016 | Rathus |
| 2016/0117061 A1 | 4/2016 | Hodgart et al. |
| 2016/0292926 A1 | 10/2016 | Rosenthal et al. |
| 2016/0337580 A1 | 11/2016 | Kwon et al. |
| 2016/0367896 A1 | 12/2016 | Lee et al. |
| 2017/0032382 A1* | 2/2017 | Shulman ............ G06Q 30/0185 |
| 2017/0124434 A1 | 5/2017 | Goodwin et al. |
| 2017/0364925 A1 | 12/2017 | Wilkinson et al. |
| 2018/0021671 A1 | 1/2018 | Liesenfelt et al. |
| 2018/0041545 A1 | 2/2018 | Chakra et al. |
| 2018/0089709 A1 | 3/2018 | Rousseau-Villella |
| 2018/0190033 A1 | 7/2018 | Barnett et al. |
| 2018/0190324 A1 | 7/2018 | Paul et al. |
| 2018/0350148 A1 | 12/2018 | George |
| 2019/0015747 A1 | 1/2019 | Thompson et al. |
| 2019/0342249 A1 | 11/2019 | Holmes |
| 2019/0362153 A1 | 11/2019 | Badalamenti et al. |
| 2020/0175140 A1 | 6/2020 | Steele |
| 2021/0097761 A1 | 4/2021 | Rizvi et al. |

FOREIGN PATENT DOCUMENTS

| | | |
|---|---|---|
| JP | 2013210783 A | 10/2013 |
| JP | 2014215929 A | 11/2014 |
| JP | 2015041126 A | 3/2015 |
| JP | 2016529581 A | 9/2016 |
| WO | 2013187130 A1 | 12/2013 |
| WO | 2014107681 A1 | 7/2014 |
| WO | 2014194419 A1 | 12/2014 |
| WO | 2016043663 A1 | 3/2016 |

OTHER PUBLICATIONS

Firefly1, "Amazon Firefly Hands-On—What is it?", video accessible at https://www.youtube.com/watch? v=oVb_5YYXJgg, Dated Jul. 23, 2014. (Year: 2014).
Firefly2, "Firefly FAQ", Amazon.com.Help, dated Jun. 9, 2014 (Year 2014).
Firefly3, Perez, "Amazon's Fire Phone Introduces Firefly, A Feature That Lets You Identify (and Buy) Things You See in the Real World", Techcrunch.com, dated Jun. 18, 2014. (Year: 2014).
Targetinasnap1, Nguyen, Nicole, "Buy target items immediately by snapping a photo", Popsugartech, dated: Jul. 23, 2014. (Year: 2014).
Targetinasnap2, Aheard, Brianna, Target's in a Snap App: Mobile Shopping Via Image Recognition, Innovative Retail Technologies, dated Jul. 25, 2014. (Year: 2014).
Targetinasnap3, Bourne, Leah, "Now You Can Shop Target Ads on Your iPhone!", Stylecaster, Jul. 22, 2014. (Year: 2014).
Aug. 28, 2018—(WO) ISR & WO—App. No. PCT/US18/038473.
TheHoiYiu: "Nike Augmented reality Case Study", You Tube, May 6, 2011 (May 6, 2011), p. 1, CP054978581, Retrieved from the Internet: URL:https://www.youtube.com/watch?v=BoawN6hVB4c [retrieved on Aug. 14, 2018], the whole document.
Adrianrdzv: Nike AR shoe demo:, You Tube, Mar. 5, 2012 (Mar. 5, 2012), p. 1, XP054978582, Retrieved from the Internet: URL:https://www.youtube.com/watch?v=WjN3CSXF9x0 [retrieved on Aug. 14, 2018], the whole document.
Nov. 30, 2018—(WO) ISR & WO—App. No. PCT/US18/050594.
Nov. 30, 2018—(WO) ISR & WO—App. No. PCT/US18/050599.
Mahmood, Zahid; Ali, Tauseef; Muhammed, Nazeer; Bibi, Nargis; Shahzad, Imran; Azmat, Shoaib; EAR: Enhanced Augmented Reality System for Sports Entertainment Application, KSII Transaction on Internet and Informationan System, Dec. 2017 (Year: 2017).
Hugo, Martin, Cache Prizes; With a Receiver in Hand and lots of Containers Cleverly Hidden in the Outdoors, Geocachers go Wherever the Growing Sport's GPS Coordinates Take Them, Feb. 16, 2006, LA Times (Year 2006).
BIT—A Framework and Architecture for Providing Digital Services for Phsyical Products; Christof Roduner ETH Zurich et al. IEEE 2010. (Year: 2010).

* cited by examiner

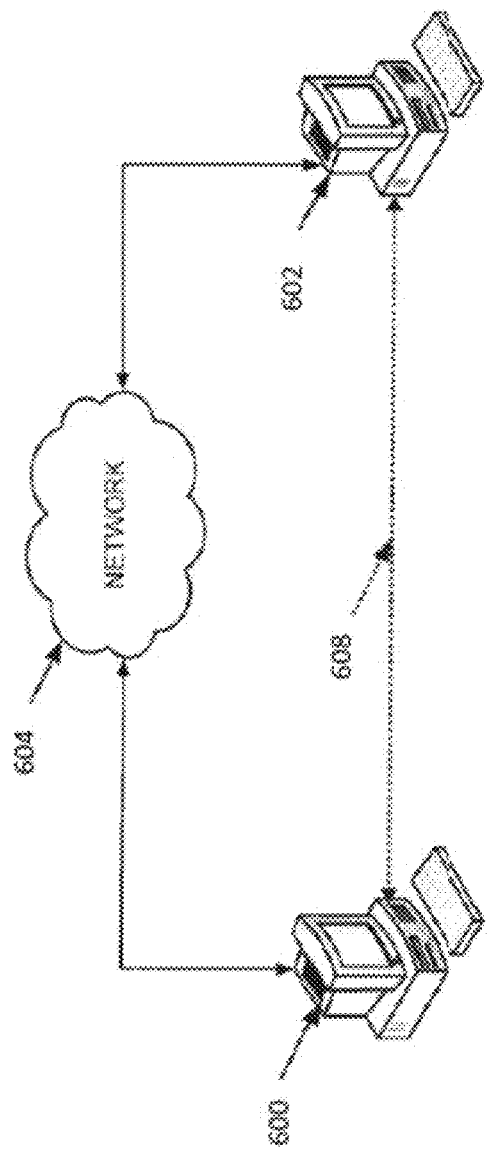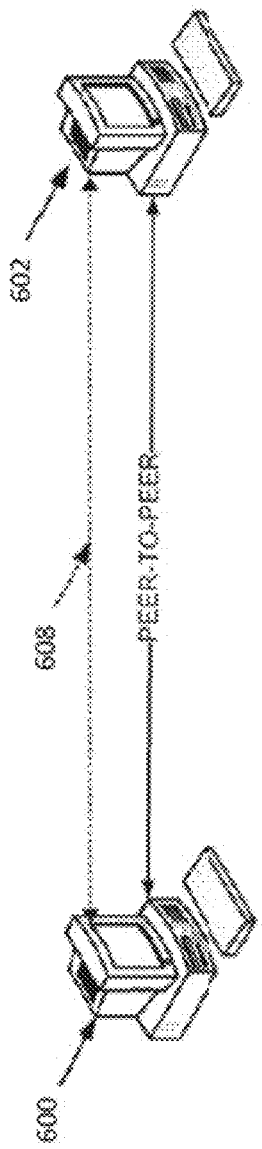
FIG. 6B
FIG. 6C

MULTI-FACTOR AUTHENTICATION AND POST-AUTHENTICATION PROCESSING SYSTEM

CROSS-REFERENCE TO RELATED APPLICATIONS

This application claims the benefit of and priority to U.S. Provisional Patent Application No. 62/557,342, entitled "MULTI-FACTOR AUTHENTICATION AND POST-AUTHENTICATION PROCESSING SYSTEM," filed Sep. 12, 2017, which is expressly incorporated herein by reference in its entirety for any and all non-limiting purposes.

BACKGROUND

The present disclosure relates to apparatuses, systems, methods, and computer generated user interfaces for using a plurality of factors, such as computer-readable indicia, to authenticate consumer products, such as articles of footwear, articles of apparel, athletic equipment, or any other type of consumer product. The present disclosure further relates to apparatuses, systems, methods, and computer generated user interfaces for monitoring user-interactions with authenticated products and/or with elements related to the authenticated products, and providing various products and services to users based on the user-interactions. The present disclosure further relates to apparatuses, systems, methods, and computer generated user interfaces for monitoring activities of a user via an image capturing device, and providing various products and services to the user based on the activities.

Recent years have ushered in dramatic advancements in electronic computing devices and their capabilities, including advances in radio wave based tracking devices. The present disclosure provides for an apparatus, system, and method for authenticating consumer products in part based on the use of these tracking devices. Prior methods of authentication generally relied on building specific design elements or labels into the product itself. The use of tracking devices in combination with one or more additional factors allows for efficient and affordable authentication, while also providing additional opportunities to increase interaction with the users of the consumer products.

The current disclosure is directed towards systems and methods to overcome one or more of the deficiencies above as well as others in the art.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Various aspects of this disclosure relate to systems and methods for authenticating a physical asset based on a scanning of an electronic tag and additional factors. An end-user computing device may utilize an imaging device to capture input from an electronic tag of a physical asset. The end-user computing device may generate supplemental digital data associated with the input. The end-user computing device may transmit the input and the supplemental digital data to an authentication and digital assets server. The authentication and digital assets server may authenticate the physical asset and transmit the authentication results to the end-user computing device, which may display the authentication results. If the authentication of the physical asset is successful, the authentication and digital assets server may select one or more digital assets and transmit the one or more digital assets to the end-user computing device. The end-user computing device may display the one or more digital assets.

BRIEF DESCRIPTION OF THE DRAWINGS

FIGS. 6A-C illustrate various examples of hardware and overall networking systems that may be used to implement various examples of the disclosure;

DETAILED DESCRIPTION

Aspects of this disclosure involve authenticating a physical asset based on an electronic tag and one or more additional factors, and providing a user associated with the physical asset one or more digital assets. Aspects of this disclosure further involve tracking user interactions with the digital assets, and rewarding the user with additional digital assets or physical assets based on the interactions.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

I. Example Personal Training System

A. Illustrative Networks

Figure 1:
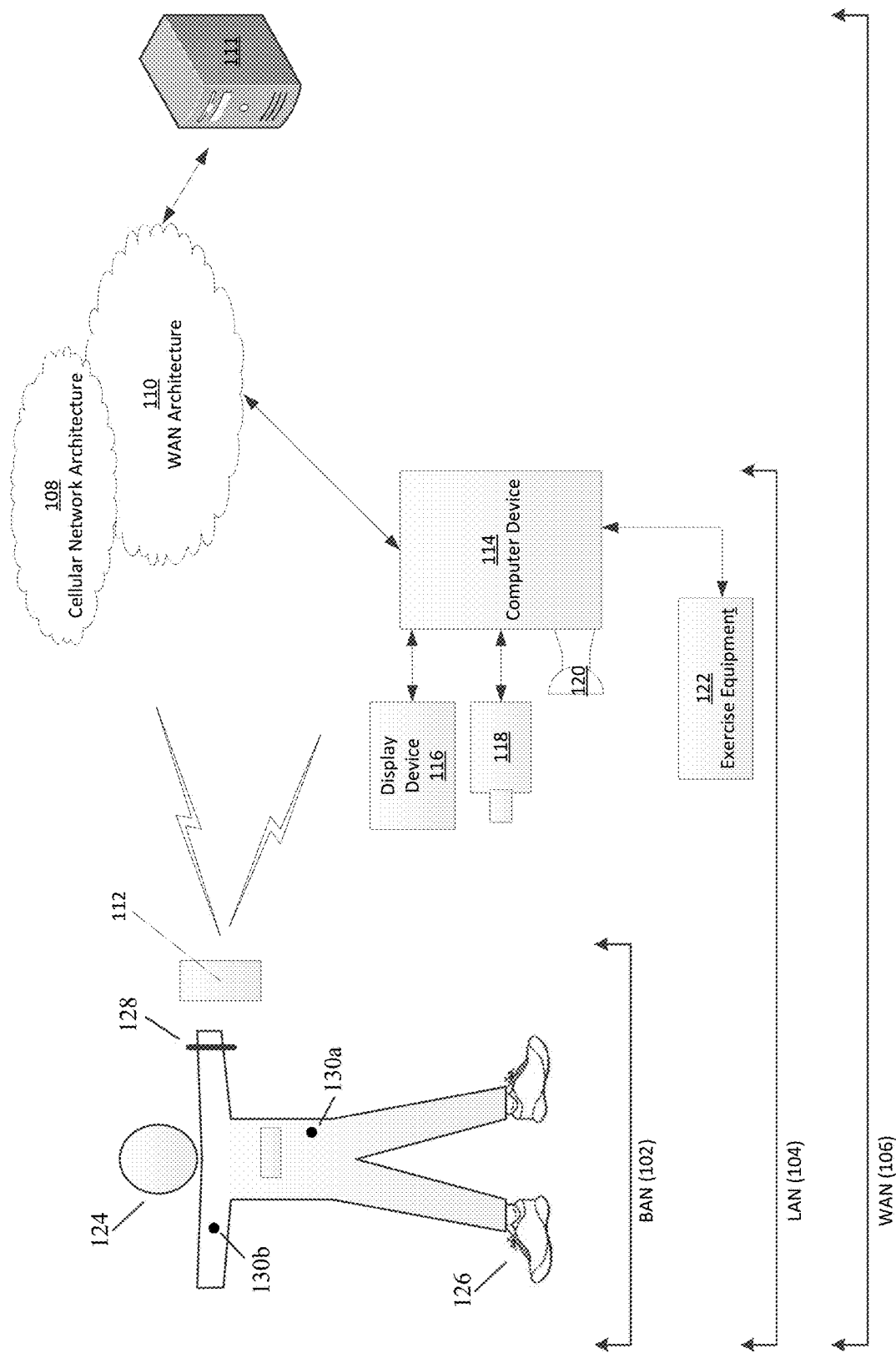
FIG. 1 illustrates an example system that may be configured to provide personal training and/or obtain data from the physical movements of a user in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a personal training system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

1. Example Local Area Network

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Figure 2:
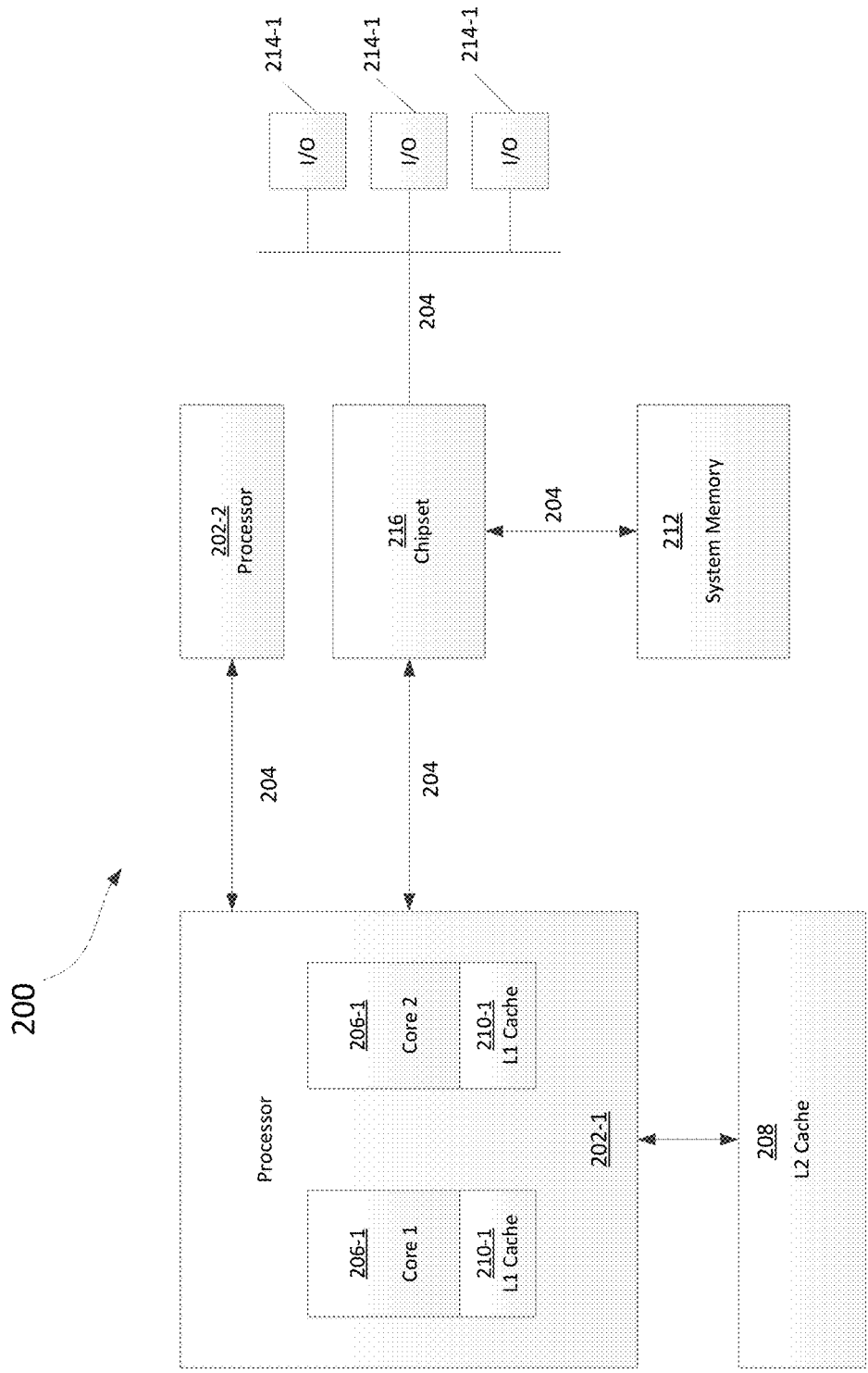
FIG. 2 illustrates an example computer device that may be part of or in communication with the system of FIG. 1.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to athletic data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from athlete 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

Information from one or more devices (across one or more networks) may be used to provide (or be utilized in the formation of) a variety of different parameters, metrics or physiological characteristics including but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

System 100 may be configured to transmit and/or receive athletic data, including the parameters, metrics, or physiological characteristics collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise athletic data, such as raw or processed data collected within system 100. System 100 may be configured to transmit data, such as energy expenditure points, to a social networking website or host such a site. Server 111 may be utilized to permit one or more users to access and/or compare athletic data. As such, server 111 may be configured to transmit and/or receive notifications based upon athletic data or other information.

Returning to LAN 104, computer device 114 is shown in operative communication with a display device 116, an image-capturing device 118, sensor 120 and exercise device 122, which are discussed in turn below with reference to example embodiments. In one embodiment, display device 116 may provide audio-visual cues to athlete 124 to perform a specific athletic movement. The audio-visual cues may be provided in response to computer-executable instruction executed on computer device 114 or any other device, including a device of BAN 102 and/or WAN. Display device 116 may be a touchscreen device or otherwise configured to receive a user-input.

In one embodiment, data may be obtained from image-capturing device 118 and/or other sensors, such as sensor 120, which may be used to detect (and/or measure) athletic parameters, either alone or in combination with other devices, or stored information. Image-capturing device 118 and/or sensor 120 may comprise a transceiver device. In one embodiment sensor 128 may comprise an infrared (IR), electromagnetic (EM) or acoustic transceiver. For example, image-capturing device 118, and/or sensor 120 may transmit waveforms into the environment, including towards the direction of athlete 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 and/or 120 may detect waveforms emitted from external sources (e.g., not system 100). For example, devices 118 and/or 120 may detect heat being emitted from user 124 and/or the surrounding environment. Thus, image-capturing device 126 and/or sensor 128 may comprise one or more thermal imaging devices. In one embodiment, image-capturing device 126 and/or sensor 128 may comprise an IR device configured to perform range phenomenology.

In one embodiment, exercise device 122 may be any device configurable to permit or facilitate the athlete 124 performing a physical movement, such as for example a treadmill, step machine, etc. There is no requirement that the device be stationary. In this regard, wireless technologies permit portable devices to be utilized, thus a bicycle or other mobile exercising device may be utilized in accordance with certain embodiments. Those skilled in the art will appreciate that equipment 122 may be or comprise an interface for receiving an electronic device containing athletic data performed remotely from computer device 114. For example, a user may use a sporting device (described below in relation to BAN 102) and upon returning home or the location of equipment 122, download athletic data into element 122 or any other device of system 100. Any I/O device disclosed herein may be configured to receive activity data.

2. Body Area Network

BAN 102 may include two or more devices configured to receive, transmit, or otherwise facilitate the collection of athletic data (including passive devices). Exemplary devices may include one or more data acquisition units, sensors, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the athlete's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128 and/or a sensing location, such as sensing location 130, which may comprise a physical device or a location that is used to collect information. One or more devices 112, 126, 128, and/or 130 may not be specially designed for fitness or athletic purposes. Indeed, aspects of this disclosure relate to utilizing data from a plurality of devices, some of which are not fitness devices, to collect, detect, and/or measure athletic data. In certain embodiments, one or more devices of BAN 102 (or any other network) may comprise a fitness or sporting device that is specifically designed for a particular sporting use. As used herein, the term "sporting device" includes any physical object that may be used or implicated during a specific sport or fitness activity. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof.

In this regard, those skilled in the art will appreciate that one or more sporting devices may also be part of (or form) a structure and vice-versa, a structure may comprise one or more sporting devices or be configured to interact with a sporting device. For example, a first structure may comprise a basketball hoop and a backboard, which may be removable and replaced with a goal post. In this regard, one or more sporting devices may comprise one or more sensors, such as one or more of the sensors discussed above in relation to FIGS. 1-3, that may provide information utilized, either independently or in conjunction with other sensors, such as one or more sensors associated with one or more structures. For example, a backboard may comprise a first sensor configured to measure a force and a direction of the force by a basketball upon the backboard and the hoop may comprise a second sensor to detect a force. Similarly, a golf club may comprise a first sensor configured to detect grip attributes on the shaft and a second sensor configured to measure impact with a golf ball.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, Calif. or Zune® or Microsoft® Windows devices available from Microsoft of Redmond, Wash. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

a. Illustrative Apparel/Accessory Sensors

In certain embodiments, I/O devices may be formed within or otherwise associated with user's 124 clothing or accessories, including a watch, armband, wristband, necklace, shirt, shoe, or the like. These devices may be configured to monitor athletic movements of a user. It is to be understood that they may detect athletic movement during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114. It is to be further understood that the sensory system 302 shown in FIG. 3 and the device assembly 400 shown in FIG. 4, each of which are described in the following paragraphs, are merely illustrative examples.

i. Shoe-Mounted Device

Figure 3:
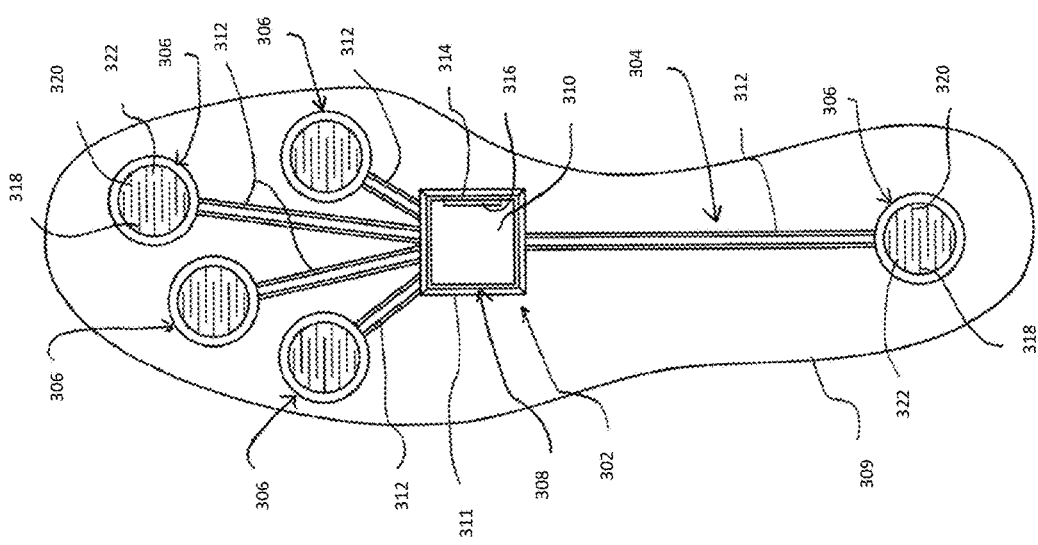
FIG. 3 shows an illustrative sensor assembly that may be worn by a user in accordance with example embodiments.

In certain embodiments, device 126 shown in FIG. 1, may comprise footwear which may include one or more sensors, including but not limited to those disclosed herein and/or known in the art. FIG. 3 illustrates one example embodiment of a sensor system 302 providing one or more sensor assemblies 304. Assembly 304 may comprise one or more sensors, such as for example, an accelerometer, gyroscope, location-determining components, force sensors and/or or any other sensor disclosed herein or known in the art. In the illustrated embodiment, assembly 304 incorporates a plurality of sensors, which may include force-sensitive resistor (FSR) sensors 306; however, other sensor(s) may be utilized. Port 308 may be positioned within a sole structure 309 of a shoe, and is generally configured for communication with one or more electronic devices. Port 308 may optionally be provided to be in communication with an electronic module 310, and the sole structure 309 may optionally include a housing 311 or other structure to receive the module 310. The sensor system 302 may also include a plurality of leads 312 connecting the FSR sensors 306 to the port 308, to enable communication with the module 310 and/or another electronic device through the port 308. Module 310 may be contained within a well or cavity in a sole structure of a shoe, and the housing 311 may be positioned within the well or cavity. In one embodiment, at least one gyroscope and at least one accelerometer are provided within a single housing, such as module 310 and/or housing 311. In at least a further embodiment, one or more sensors are provided that, when operational, are configured to provide directional information and angular rate data. The port 308 and the module 310 include complementary interfaces 314, 316 for connection and communication.

In certain embodiments, at least one force-sensitive resistor 306 shown in FIG. 3 may contain first and second electrodes or electrical contacts 318, 320 and a force-sensitive resistive material 322 disposed between the electrodes 318, 320 to electrically connect the electrodes 318, 320 together. When pressure is applied to the force-sensitive material 322, the resistivity and/or conductivity of the force-sensitive material 322 changes, which changes the electrical potential between the electrodes 318, 320. The change in resistance can be detected by the sensor system 302 to detect the force applied on the sensor 316. The force-sensitive resistive material 322 may change its resistance under pressure in a variety of ways. For example, the force-sensitive material 322 may have an internal resistance that decreases when the material is compressed. Further embodiments may utilize "volume-based resistance", which may be implemented through "smart materials." As another example, the material 322 may change the resistance by changing the degree of surface-to-surface contact, such as between two pieces of the force sensitive material 322 or between the force sensitive material 322 and one or both electrodes 318, 320. In some circumstances, this type of force-sensitive resistive behavior may be described as "contact-based resistance."

ii. Wrist-Worn Device

Figure 4:
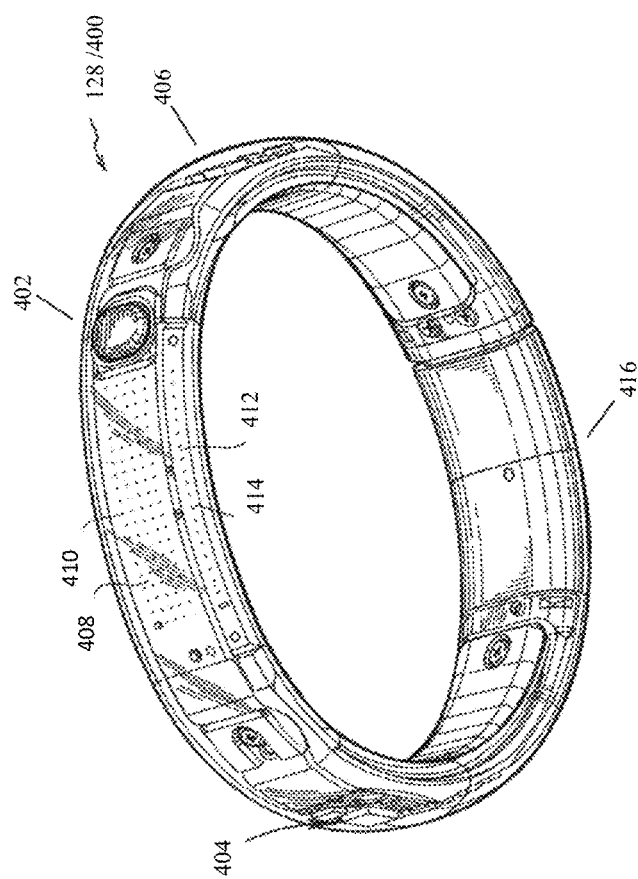
FIG. 4 shows another example sensor assembly that may be worn by a user in accordance with example embodiments.

As shown in FIG. 4, device 400 (which may resemble or comprise sensory device 128 shown in FIG. 1), may be configured to be worn by user 124, such as around a wrist, arm, ankle, neck or the like. Device 400 may include an input mechanism, such as a depressible input button 402 configured to be used during operation of the device 400. The input button 402 may be operably connected to a controller 404 and/or any other electronic components, such as one or more of the elements discussed in relation to computer device 114 shown in FIG. 1. Controller 404 may be embedded or otherwise part of housing 406. Housing 406 may be formed of one or more materials, including elastomeric components and comprise one or more displays, such as display 408. The display may be considered an illuminable portion of the device 400. The display 408 may include a series of individual lighting elements or light members such as LED lights 410. The lights may be formed in an array and operably connected to the controller 404. Device 400 may include an indicator system 412, which may also be considered a portion or component of the overall display 408. Indicator system 412 can operate and illuminate in conjunction with the display 408 (which may have pixel member 414) or completely separate from the display 408. The indicator system 412 may also include a plurality of additional lighting elements or light members, which may also take the form of LED lights in an exemplary embodiment. In certain embodiments, indicator system may provide a visual indication of goals, such as by illuminating a portion of lighting members of indicator system 412 to represent accomplishment towards one or more goals. Device 400 may be configured to display data expressed in terms of activity points or currency earned by the user based on the activity of the user, either through display 408 and/or indicator system 412.

A fastening mechanism 416 can be disengaged wherein the device 400 can be positioned around a wrist or portion of the user 124 and the fastening mechanism 416 can be subsequently placed in an engaged position. In one embodiment, fastening mechanism 416 may comprise an interface, including but not limited to a USB port, for operative interaction with computer device 114 and/or devices, such as devices 120 and/or 112. In certain embodiments, fastening member may comprise one or more magnets. In one embodiment, fastening member may be devoid of moving parts and rely entirely on magnetic forces.

In certain embodiments, device 400 may comprise a sensor assembly (not shown in FIG. 4). The sensor assembly may comprise a plurality of different sensors, including those disclosed herein and/or known in the art. In an example embodiment, the sensor assembly may comprise or permit operative connection to any sensor disclosed herein or known in the art. Device 400 and or its sensor assembly may be configured to receive data obtained from one or more external sensors.

iii. Apparel and/or Body Location Sensing

Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130a and 130b may be sensors integrated into apparel, such as athletic clothing. Such sensors may be placed at any desired location of the body of user 124. Sensors 130a/b may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Figure 5:
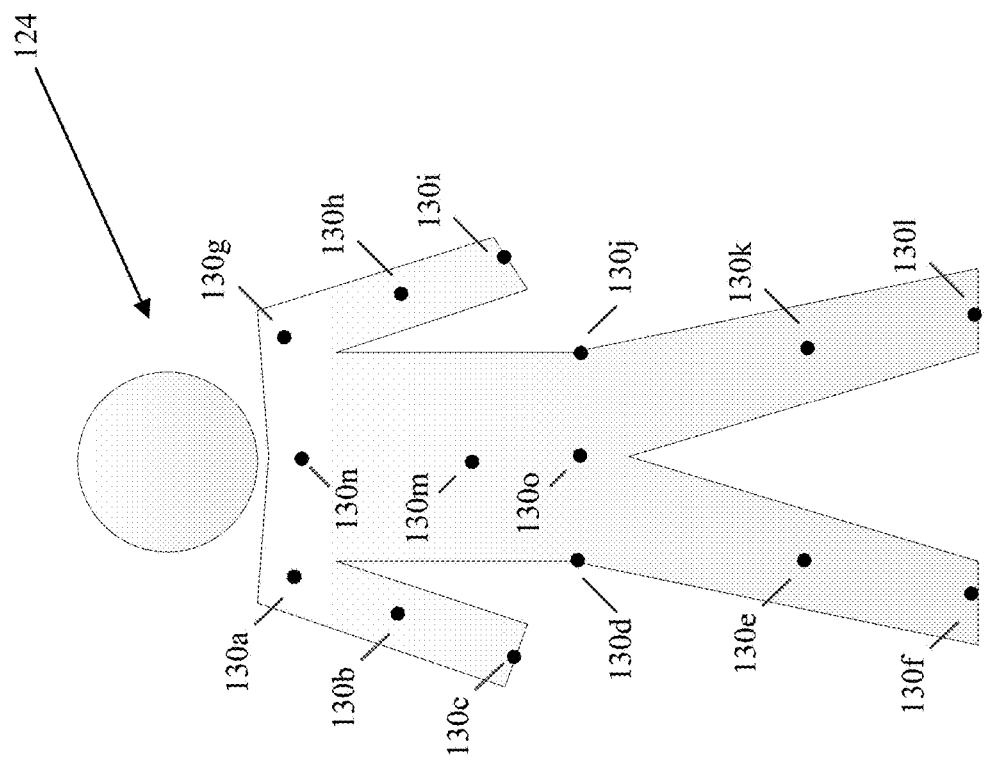
FIG. 5 shows illustrative locations for sensory input which may include physical sensors located on/in a user's clothing and/or be based upon identification of relationships between two moving body parts of the user.

FIG. 5 shows illustrative locations for sensory input (see, e.g., sensory locations 130a-130o). In this regard, sensors may be physical sensors located on/in a user's clothing, yet in other embodiments, sensor locations 130a-130o may be based upon identification of relationships between two moving body parts. For example, sensor location 130a may be determined by identifying motions of user 124 with an image-capturing device, such as image-capturing device 118. Thus, in certain embodiments, a sensor may not physically be located at a specific location (such as one or more of sensor locations 130a-130o), but is configured to sense properties of that location, such as with image-capturing device 118 or other sensor data gathered from other locations. In this regard, the overall shape or portion of a user's body may permit identification of certain body parts. Regardless of whether an image-capturing device is utilized and/or a physical sensor located on the user 124, and/or using data from other devices, (such as sensory system 302), device assembly 400 and/or any other device or sensor disclosed herein or known in the art is utilized, the sensors may sense a current location of a body part and/or track movement of the body part. In one embodiment, sensory data relating to location 130m may be utilized in a determination of the user's center of gravity (a.k.a, center of mass). For example, relationships between location 130a and location(s) 130f/130l with respect to one or more of location(s) 130m-130o may be utilized to determine if a user's center of gravity has been elevated along the vertical axis (such as during a jump) or if a user is attempting to "fake" a jump by bending and flexing their knees. In one embodiment, sensor location 1306n may be located at about the sternum of user 124. Likewise, sensor location 130o may be located approximate to the naval of user 124. In certain embodiments, data from sensor locations 130m-130o may be utilized (alone or in combination with other data) to determine the center of gravity for user 124. In further embodiments, relationships between multiple sensor locations, such as sensors 130m-130o, may be utilized in determining orientation of the user 124 and/or rotational forces, such as twisting of user's 124 torso. Further, one or more locations, such as location(s), may be utilized as (or approximate) a center of moment location. For example, in one embodiment, one or more of location(s) 130m-130o may serve as a point for a center of moment location of user 124. In another embodiment, one or more locations may serve as a center of moment of specific body parts or regions.

Figure 6A:
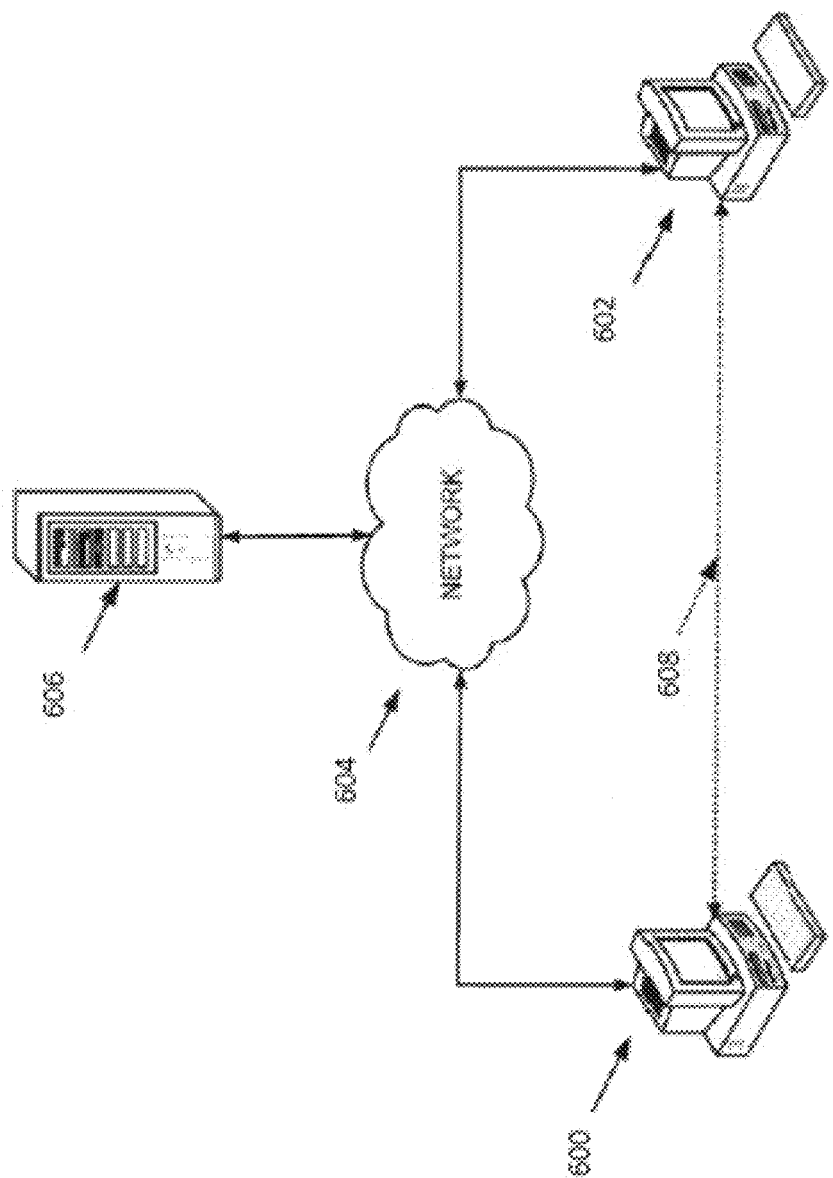

FIGS. 6A through 6C illustrate various examples of hardware systems on which systems and user interfaces according to this disclosure that may be implemented and on which methods according to this disclosure may be practiced. In an embodiment, multiple users may work together share and capture target images using augmented reality programs.

FIG. 6A shows a first computing device 600 and a second computing device 602 connected and in communication with one another via a network 604, such as via an internet connection, via a local area network (LAN), via a wide area network (WAN), etc. The two computing devices 600 and 602 may be located remotely from one another. In some aspects the computing device 600 and 602 may be mobile devices, such as cell phones or tablets. As shown in FIG. 6A, the two computing devices 600 and 602 each establish a communication channel within the network 604 and communicate with a messaging server system 606 (comprising one or more server computers) that provide data or information about the target between the computing devices 600 and 602. Any desired communication link and communication protocol may be used to provide and control the data exchange between computing devices 600 and 602. If desired, this same server system 606 may provide communication data between the users on the computing devices 600 and 602 (such as textual message data, webcam data, etc.) as will be described in more detail below. Alternatively, if desired, a separate communication link 608 may be provided to support transfer of communication data between the computing devices 600 and 602.

Any desired types of computing devices 600 and 602 may be used without departing from this disclosure, such as any computing device capable of establishing a networked connection and/or a peer-to-peer connection and capable of providing the necessary display, user interface, and input capabilities, as will be described in more detail below. Some more specific examples of computing devices 600 and 602 that may be used in systems and methods in accordance with at least some examples of this disclosure include, but are not limited to: desktop computers, personal computers, laptop computers, palmtop computers, handheld computers, cellular telephones, personal digital assistants, computer workstations, televisions, and the like. Notably, the various computing devices 600, 602, etc. may be in communication with the network 604 and the server system 606 in the same or different manners without departing from this disclosure. Moreover, the communicating computing devices 600, 602, etc. used to display and capture the target image may be the same type or different types without departing from this disclosure (such as one desktop computer and one cellular telephone device), and the computing devices 600, 602, etc. may communicate with each other or with a system database 606 via the same communication channels or via different communication channels (e.g., both users may connect to the system database through Wi-Fi, or one may connect to the system database through Wi-Fi while the other connects through cellular data. In further aspects, computing devices may display target images via the same applications or via different applications (e.g., both users may display the target image through a single application, such as Instagram, or through different applications (such as one user through Instagram and another user through a Facebook application, etc.).

Computing devices 600 and 602 that may be used in systems and methods in accordance with examples of this disclosure may include one or more input devices and a data processing system (e.g., including one or more microprocessors). Examples of input devices that may be included with computing devices 600, 602 include, but are not limited to conventional input devices, such as: a keyboard (hard keyboard or soft keyboard); a mouse, trackball, rollerball, touchpad, or other pointing device; a stylus or other pen-type input device (e.g., for a tablet PC type computing device); a disk drive; a USB port; a network connection; a joystick type controller; a telephone connection; an Ethernet connection; voice recognition capabilities; etc. Also, any desired type of display device may be provided for use in conjunction with the computing devices 600, 602 of systems and methods according to this disclosure, including display devices integrated with the computing device 600, 602 itself or display devices separate from the computing devices 600, 602 but in communication therewith, such as projector displays, separate monitor displays, etc.

The computing devices 600 and 602 may be connected to the network 604 in any desired manner without departing from this disclosure, including in conventional manners that are known and used in the art, such as any conventional wired or wireless connection and using any network connection protocol. The communication channel connection 608 between the computing devices 600, 602 may be the same as or different from the system database connections without departing from this disclosure, and this connection 608 may include technology that is conventional and known in the art. In addition to various computer-to-computer communication links that are known and used in the art for providing live, real time communications between two (or more) computers, the communication channel connection 608 further may include other types of communication channels between computers or users, such as an instant messaging channel, a peer-to-peer messaging channel, a conventional telephone connection, etc. As another alternative, if desired, the users could be located in close proximity to one another and may be allowed to communicate directly, in a face-to-face conversation, without the need for a separate communication channel. The communication channel 608, when provided, may use all of the same hardware as involved in the target image data exchange, all different hardware, or a combination thereof (e.g., some users using the same hardware, others using different hardware, etc.).

As described above (and as will be described in more detail below), systems and methods in accordance with examples of this disclosure will provide a user interface display on the user's computing device 600, 602. This interface will allow the user to see the target image and will allow the user to display the target image for another user to capture. The user interfaces on the various devices will be provided and controlled by one or more of the computing devices 600, 602 and/or by the server system 606, and data for generating, maintaining, and receiving input through the user interfaces will be generated and provided via computer readable media included as part of or associated with one or more of the computing devices 600, 602 and/or the server system 606. Examples of such computer readable media include, but are not limited to: computer-readable memories, both internal to a computer (e.g., hard drives) or separable from the computer (such as disks, solid state or flash memory devices, data available over a networked connection, etc.), including any type of computer readable media that is conventionally known and used in the computer arts.

In the example overall system shown in FIG. 6A, the software for generating the user interface may reside on computer readable media present on or available to any one of computing device 600, computing device 602, or server system 606. Alternatively, if desired, the software, or at least some portion(s) thereof, may be reside on more than one of, or all of computing device 600, computing device 602, or server system 606. The sever system 606 may be operated and maintained by the same organization(s) or individual(s) that operate and maintain at least one of the computing devices 600 and 602 and/or network 604, or the server system 606 may be operated, controlled, and maintained by a party separate from any or all of these entities. As some more specific examples, server system 606 may be operated and maintained (and the user interface software also may be operated and maintained) by one or more entities whose products are being marketed and granted access through the augmented reality programs (e.g., a manufacturer, a retailer, a vendor selected by a manufacturer or retailer, etc.).

Another example overall system set up is illustrated in FIG. 6B. While the overall network features 604 may be the same as or similar to those described above in conjunction with FIG. 6A (e.g., LAN, WAN, internet, etc.), in this example set up, the separate and independent server system 606 is omitted. Rather, in the setup of FIG. 6B, at least one of the two computing devices 600, 602 (and optionally both computing devices 600, 602) drives the data exchange communications and includes the software for generating and controlling the user interface.

If desired, the networked communication between the users to exchange data may include features that allow the users to communicate with one another about the target image. Alternatively, as shown in FIG. 6B, a separate user communication link 608 is illustrated. In addition to various computer-to-computer communication links that are known and used in the art for providing live, real time communications between two (or more) computers, the communication channel connection 608 further may include other types of communication channels between computers or users, such as an instant messaging channel, a peer-to-peer messaging channel, a conventional telephone connection, etc. As another alternative, if desired, the users could be located in close proximity to one another and may be allowed to communicate directly, in a face-to-face conversation, without the need for a separate communication channel 608. The communication channel 608 may use the same or different hardware from that used in the target image data exchange.

Collaboration between users to display and capture the target images also may take place, in at least some systems and methods in accordance with this disclosure, via direct communication between computing devices in a peer-to-peer manner, as shown in FIG. 6C. Any desired hardware and/or protocols for this type of peer-to-peer communication may be used without departing from this disclosure, including conventional hardware and protocols as are known and used in the computer communications art. Also, as with the examples of FIGS. 6A and 6B described above, a separate user communication channel connection 608 may be provided (e.g., for instant messaging, additional peer-to-peer messaging, a conventional telephone connection (which may use different hardware from that involved in inputting or capturing the target image data), etc.). The various other alternatives as described above for FIGS. 6A and 6B also may be used in the setup of FIG. 6C without departing from this disclosure.

Figure 8:
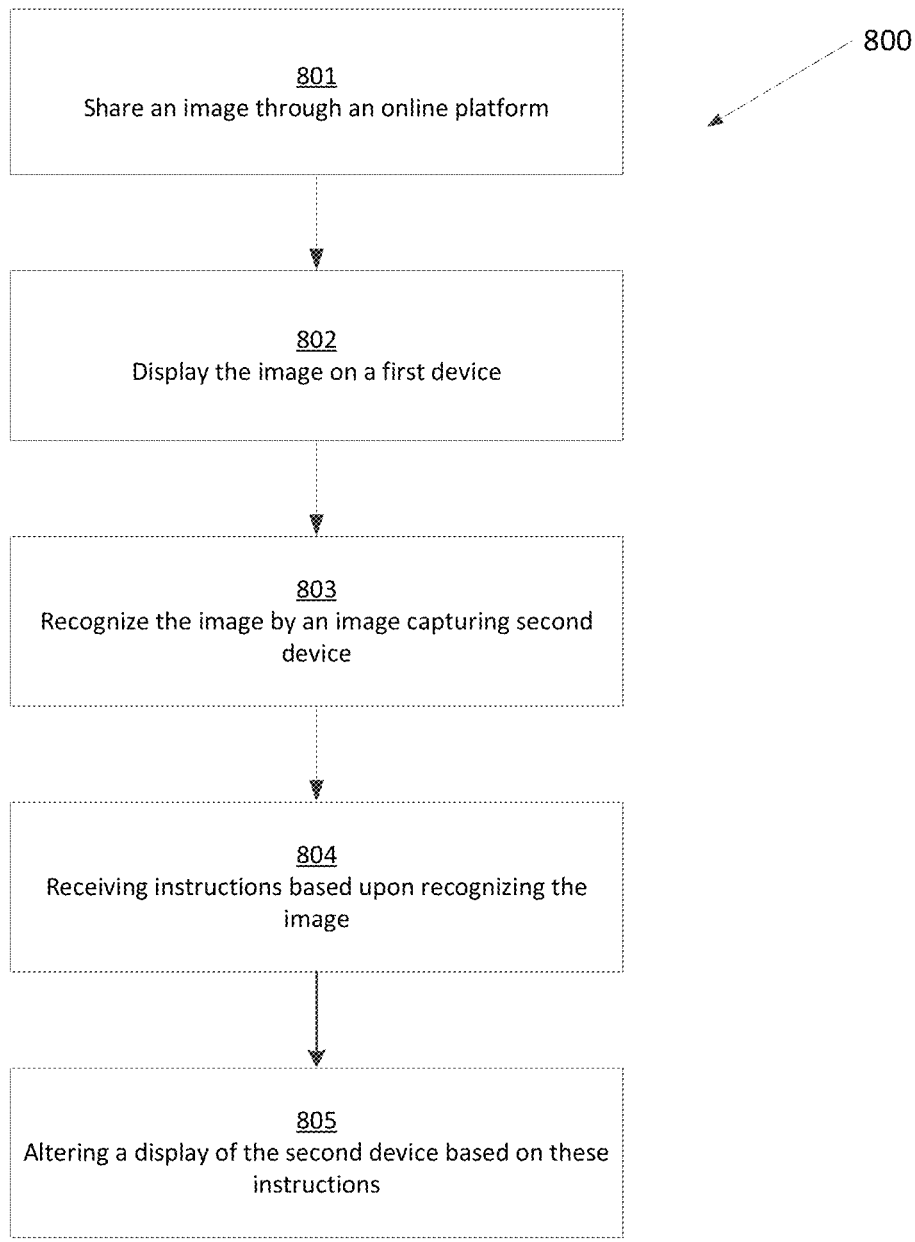
FIG. 8 illustrates a flowchart showing examples of performing steps discussed in the present disclosure.
Figure 9:
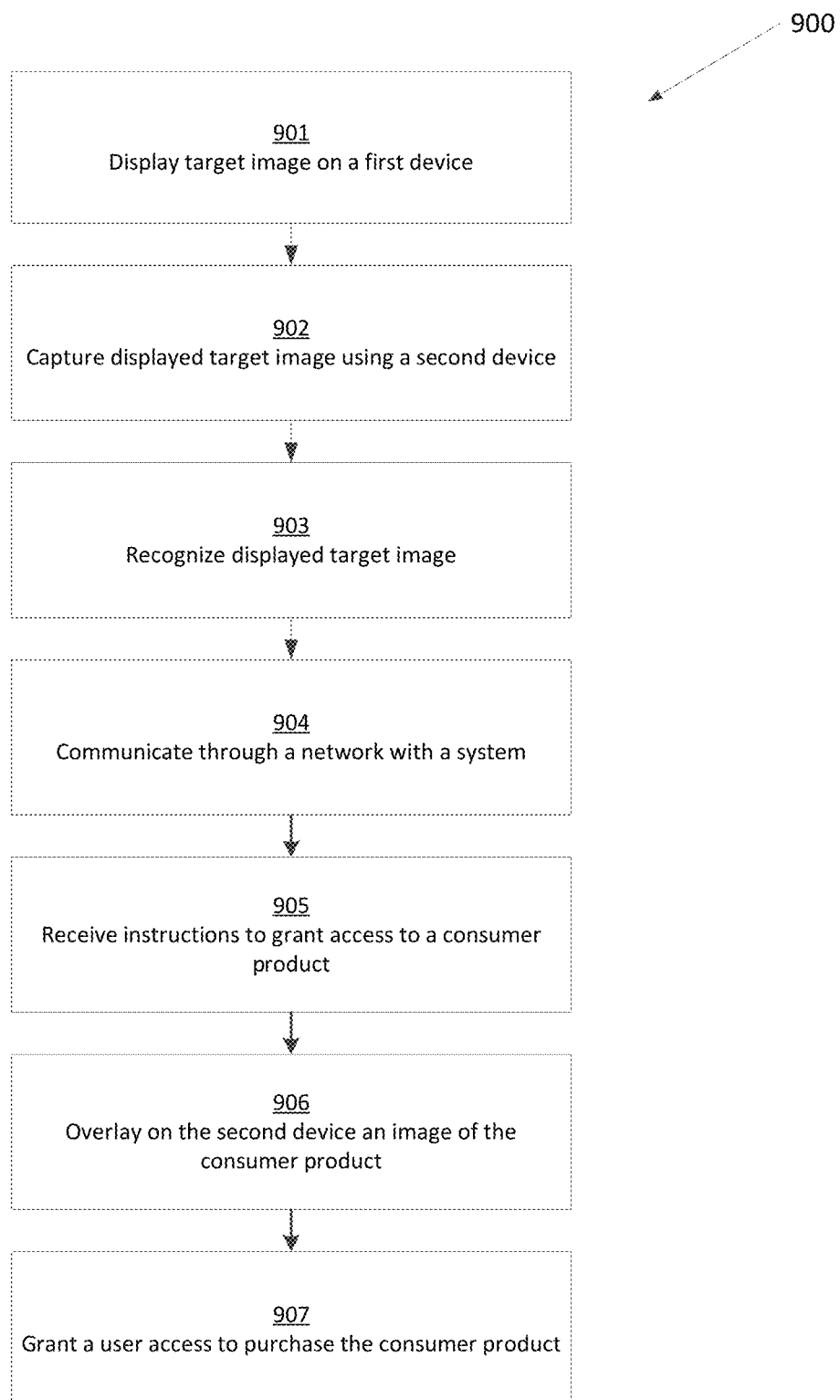
FIG. 9 illustrates another flowchart showing examples of performing steps discussed in the present disclosure.

FIGS. 8-9 illustrate example embodiments for methods of using augmented reality programs to capture target images and upon verifying the captured image is a target image, performing a predefined output such as unlocking access to purchase a consumer product. The steps shown in these example flow charts may be executed by a single computing device, such as processors included in the first mobile device 705 or second mobile device 706. Alternatively, execution of the steps may occur through only one of the first mobile device or second mobile device, or in combination with a system database 707. In some aspects the steps will be performed in order, but in other aspects steps may be performed in a different order or concurrently. For example, in some embodiments, captures may be performed by either of the user device, that capture information communicated to a system database, where the system database then determines if the capture information is recognized as a target image and responding to the user device with instructions. However, in other embodiments, the system database may communicate target image information and instructions to the mobile device prior to the user device capturing an image. Therefore the capturing of the target image, recognition of the target image, and execution of the instructions may all be performed at either user device 705 or 706.

Figure 7:
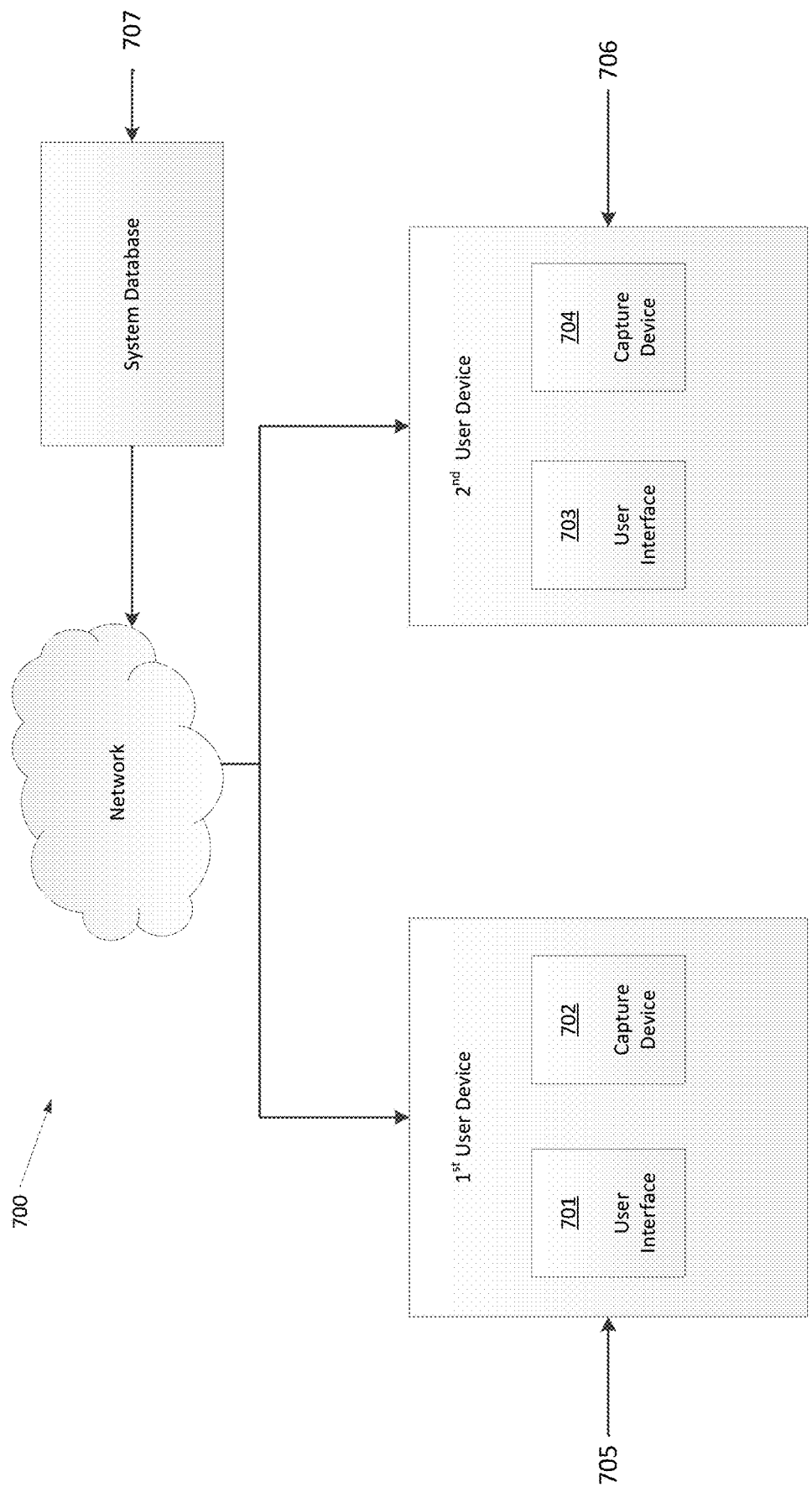
FIG. 7 illustrates an example of a hardware and networking system that may be used to implement various examples of the disclosure.

FIG. 7 illustrates an exemplary system for implementing the present disclosure. As shown in FIG. 7, two user devices may comprise a user interface and a capture device. The user interface may include both a display and an input mechanism, where the input mechanism may be a button, touchscreen, or other way to input information. The image capture devices, 702 and 704, may include one or more video cameras. The image capture devices may be configured to capture or record images or video, including recording or capturing the user interface display, 701 and 703, of the other user's device. The user devices may be connected through a network to a system database which can analyze the captured images or video to determine if a target image is recognized, and send further instructions to the user devices upon confirming recognition of the target image.

FIG. 8 illustrates an exemplary flowchart of steps that certain embodiments may take. First, at step 801, an image may be shared through an online platform. In some aspects this online platform may be a social media platform, such as Instagram, Twitter, Facebook, Google+, or any other social media platform. The image may include target information to be recognized by a capturing device. The image may be shared by a first user through their social media account. As a next step, at 802 the image may be displayed on a first device. This may include through a second user's social media account. In some aspects a first user may share an image through an online platform and a second user may view the image using the same social media platform or through a different social media platform.

At the next step 803, a second device may capture the image and determine whether it recognizes the image. In some aspects the second device may use a camera to take still images or record video of the image. Upon capturing the image, the second device may communicate with a database to determine whether it recognizes the image as a target. If the device confirms recognition of the target image it may receive instructions upon recognizing the image at step 804. The instructions may include unlocking access to allow the user of the second device to purchase a consumer product. In some aspects step 805 may involve altering a display of the second device based on the instructions. This may include overlaying a consumer product on the display, or changing the display such as by presenting a message or video to a consumer, or altering recognized and/or captured images.

FIG. 9 illustrates an exemplary flowchart showing steps that certain embodiments may take. First, at step 901, an image may be displayed on a first device. In some aspects this display may occur through an online platform, such as Instagram, Twitter, Facebook, Google+, or any other social media platform. The image may include target information to be recognized by a capturing device. The image may be shared by a first user through their social media account. At step 902, the image may then be captured using a second device, including through the second device's camera or image capturing device. The second device may then recognize the target image at step 903. This may include communicating with a database to determine whether the database recognizes the image as a target. Upon recognition of the target image, the second device may communicate through a network with a system or a database at step 904. For example, the second device may transmit one or more messages through the network, the one or more messages indicating that the second device has identified the image as being a target image. At step 905, the second device may receive instructions from the system or database to grant the user access to purchase a consumer product. Upon receiving these instructions, at step 906 the second device may overlay an image of the consumer product on the display image. The second device may output for display the image of the consumer product overlaid on the display image. The overlay may be one, two, and/or three dimensional. For example, the device may overlay a three-dimensional projected representation of the consumer product that will be unlocked. In this regard, the image may be overlaid on the recognized target, so that as the user moves the camera around, the projected representation will move, allowing the user to see different angles of the product. At a final step 907, the device may grant the user access to purchase the consumer product that has been unlocked.

Figure 10:
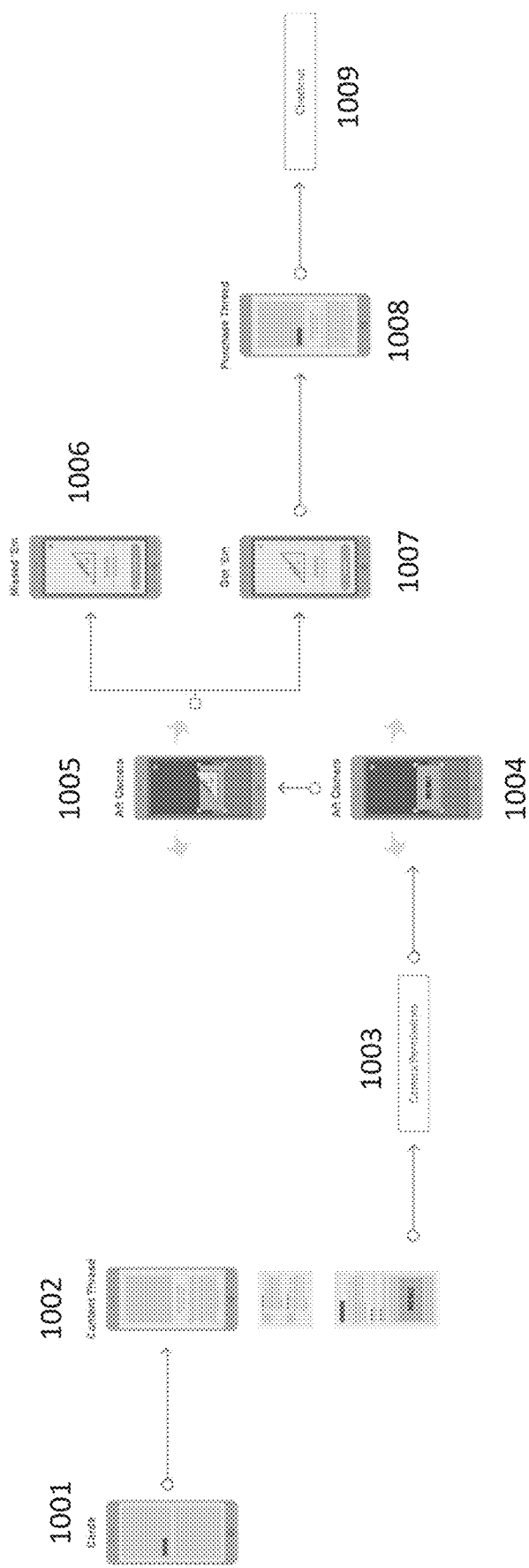
FIG. 10 illustrates another flowchart showing examples of performing steps disclosed in the present disclosure, including the displays associated with the mobile devices.

FIG. 10 illustrates another flowchart showing examples of performing steps disclosed in the present disclosure, including the displays associated with the mobile devices. At step 1001, a software application may be displayed on a computing device. The computing device may be a mobile device, such as a cellular device. The mobile application may include a camera application. The mobile application may be include one or more user interfaces, each of which may display one or more images. At step 1002, a user of the computing device may be consuming content from one or more sources. For example, the content may be generated by and displayed within the software application. In another example, the content may be an Internet website, such as the Internet website of a restaurant. In another example, the content may be an online social media platform. In another example, the content may be sourced from an image capturing application executing on the computing device. At step 1003, the user may access an image capturing application of the computing device. At step 1004, the user may utilize the image capturing application to capture a still image or video image. At step 1005, the computing device may determine that the captured image is a target image. As discussed above in reference to FIGS. 8 and 9, confirming that the captured image is a target image may include communicating with a database. Further at step 1005, the software application may, responsive to determining that the captured image is a target image, generate a modified display within the user interface of the software application. For example, the mobile application may overlay an image of a consumer product onto the captured image. The computing device may then display the image of the consumer product overlaid onto the captured image. The overlay may be one, two, or three dimensional. For example, a three-dimensional image of the consumer product may be overlaid onto the captured image. The resulting image may then be displayed within the software application. Alternatively, the resulting image may be displayed by a specialized augmented reality software application executing on the computing device.

Once the resulting image is displayed (by the specialized augmented reality software application or the software application) the user may unlock the consumer product. In one example, the user may unlock the consumer product by interacting with one or more of the software application, the user interface, and the resulting image. The interaction may comprise viewing the image, sharing the image, saving the image, and the like. If the user successfully unlocks the consumer product, a modified graphical user interface may be output for display at step 1007. The modified graphical user interface may notify the user that the consumer product has been successfully unlocked. The modified graphical user interface may include one or more graphical buttons, which, when selected by the user, allow the user to purchase the consumer product.

In certain instances, the number of times the consumer product may be unlocked may be limited. If the limit has already been reached, a modified graphical user interface may be output for display at step 1006. Here, the modified graphical user interface may indicate that the user has not successfully unlocked the consumer product.

Responsive to viewing the modified graphical user interface output at step 1007, the user may select to purchase the unlocked consumer product. At step 1008, one or more graphical screens may be generated, granting the user permission to purchase the consumer product. At step 1009, the user may complete the purchase of the unlocked consumer product.

In some aspects of the present disclosure, a first individual may share an image through a platform, where a second individual is able to view that image on a mobile device. In some aspects the platform may be a social media platform. By viewing the image on a display on their mobile device, the second individual is able to share the image with a third individual. The third individual may then use an image capture device to capture the image as it displayed on the second individual's mobile device. Upon recognition of the captured image, the third individual's device may grant the third individual access to purchase a consumer product.

In some aspects a user may use a mobile device to capture images, such as through a camera or other image capture means. In some aspects the images may be still images, or the device may be configured to capture videos. In certain embodiments the user may use a mobile device to capture images of the surrounding environment. The mobile device may also have a user interface including a display. In some aspects the user interface and camera may be configured to simultaneously display what the camera is recording on the user interface.

In some embodiments the mobile device may include augmented reality programs. In these embodiments a user may use the camera on their mobile device to capture images in their environment. The captured images may be simultaneously outputted on the user interface display. In some aspects the mobile device may be configured to recognize target images when captured by the mobile device camera. Upon recognition of these target images, the mobile device may communicate through a network with a system database and confirm recognition of the target image. The device may then receive instructions from the system database upon confirmation of the target image.

In different embodiments the instructions may instruct the mobile device through the augmented reality program to overlay a three-dimensional projection on top of the target image being displayed on the user interface. In certain aspects this projection may be a consumer product. The projection may represent a consumer product available for the user to purchase. In some aspects the user interface may allow the user to interact with the projected product. This interaction may include a user input such as a button or the user interface may be touch-screen and allow the user to click on the projected product by touching it. After interacting with the projected product the mobile device may grant the user access to purchase the projected product.

In some examples the system may offer other outcomes upon capturing and recognizing the target image. For example, in some aspects the user may capture an image through a camera, and after recognizing the image as containing a target, the mobile device may change the outputted display in response to recognizing the target image. As examples, the display may continue to output what is being captured by the camera, but may change the outputted display based on recognition of additional targets. In some aspects, the device may recognize a type of product, a brand logo, numbers, designs, letters, or any other target and replace that target on the outputted display. As an example, the user may be in a store, and using the camera to capture the inside of a store. The mobile device may be configured to recognize a particular logo on a product, and then output on the display the images captured by the camera but replace the recognized logos on the display with an image or message for the user.

In certain aspects users may share images through social media platforms. Individuals may then see the images on the social media through displays on their mobile device. An individual who sees the image may share it with a friend, who may look at it through an image capturing device having augmented reality capabilities. Upon recognizing the image, the software may display a three-dimensional product of a consumer product overlaid on the image. This would indicate that the user capturing the image has been granted access to purchase the consumer product shown. In this aspect the user may then choose to search for the image on their social media accounts and share it with their friends, who may use a mobile device with augmented reality capabilities to capture the image and gain access to purchase the product as well.

In some embodiments, a first individual may share an image through social media, where that image includes target information that unlocks access for purchasing consumer products. A second individual may view that image on a mobile device having a display. A third individual may capture that image on a mobile device having image capturing capabilities, where through capturing the image the device recognizes that image and unlocks access for the third individual to purchase a consumer product. In some aspects the system may recognize that the image has been shared and/or captured from another mobile device. In these aspects, the access may be limited to capture from another individual's phone, or from a certain social media application. The number of users who are granted to access to the product may be limited, such that only a certain number of user are granted access before the product is sold out. The system may limit the number of times an image can be shared and still unlock access to the product.

In some embodiments the target image may be shared through social media. Individuals may view the target image through social media accounts. Individuals who view the target image may share the images with friends, who may then capture the image using a camera on a mobile device. The camera may recognize the target image through an augmented reality program, and upon recognizing the target image receive instructions from a system database. These instructions may include overlaying a consumer product projection onto a user interface on the user's device, and unlocking access to the user to purchase the consumer product.

In some aspects the camera may only recognize the target image when it is displayed on another device's screen. In these aspects, access the consumer product will not be unlocked unless the target image is captured from another user's screen. In these examples individuals are encouraged to share the target image with each other. One user may bring the target image up on their mobile device so that another user may capture it and unlock the consumer product. The second user may open the target image on their mobile device so the first user may capture and unlock the consumer product.

In example embodiments, a user's computing device (which may be mobile, stationary, and/or located in a commercial or private setting) may comprise one or more non-transitory computer-readable mediums that comprise computer-executable instructions that when executed by a processor, cause the device to capture an image of a second mobile device, and upon capturing that image recognizing that image as an instruction. The mobile device may then communicate through a network with an external system. Upon verifying the captured image, the system may unlock the mobile device access to purchase a consumer product.

Granting access to consumer products through augmented reality encourages users to share images and be on the hunt for targets in nearly any image. For example, if a user knows that a certain influencer, such as a famous athlete, is releasing a product or endorses a product, that user may scan the athlete's social media accounts to see if any images shared by the athlete have a target that would unlock access to purchase the products. In different aspects this may be footwear, jerseys, apparel, sports equipment, or any other consumer product. It also encourages users to share images among their friends, in the hope that they're able to find target images and capture them using each other mobile device, such as smartphones.

In some embodiments product launches may be rolled out through social media. In these aspects, a product may be announced, but it there is not an announcement about when the product will be released. Rather, an image containing the target information that will unlock access to purchase the product may be given to an influencer, such as an athlete, chef, social media personality, business person, celebrity, etc. The augmented reality program may then be configured to recognize the target image when it is captured using a mobile device. The influencer may then share the product on social media. In some aspects the influencer may not announce that the image contains target data. Rather, consumers are encouraged to look at images using the augmented reality program to find images with target information. After discovering that an image contains target information that will unlock access to a new product or perform some other function, the user is encouraged to share the image with their friends, including through social media. In these aspects, the image will be shared organically through word of mouth as individuals discover that the image has unlock capabilities and share the image.

In some aspects the augmented reality program will be utilized to work on mobile devices, including smartphones, such as an Apple iPhone or an Android phone, tablets, laptops, computers, gaming systems, music players, e-readers, or any other mobile electronic device capable of capturing images.

Figure 11:
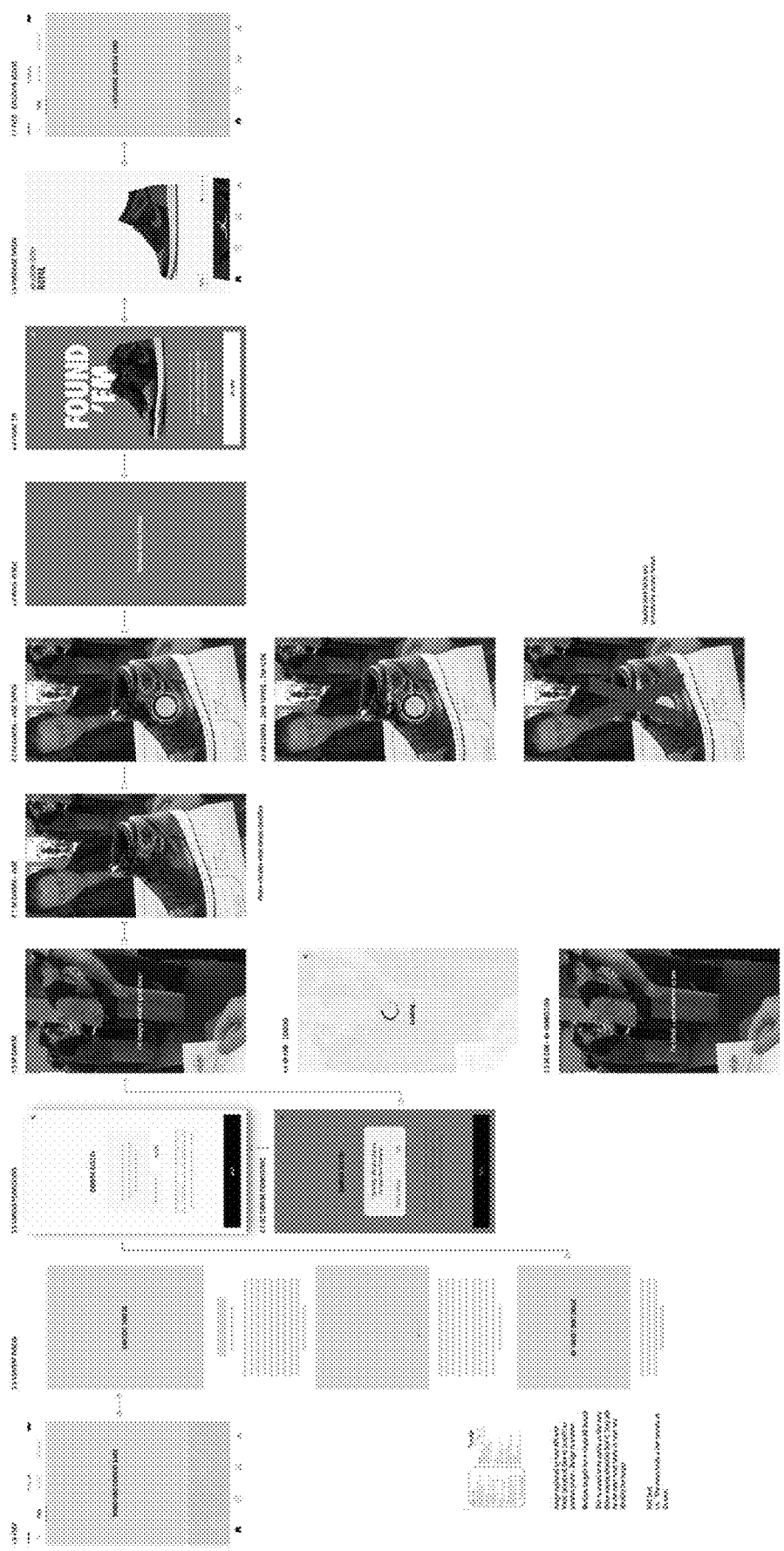
FIG. 11 illustrates another flowchart showing examples of performing steps disclosed in the present disclosure, including the displays associated with the mobile devices.
Figure 12:
FIG. 12 illustrates an example of the displays that may be utilized by the augmented reality program.

In certain aspects the target image may be a tangible item. As an example, the target image may be a restaurant menu. The augmented reality program may then be configured to recognize when the restaurant menu is captured by the mobile device, and unlock access to purchase a consumer product. In some aspects the mobile device may overlay a projected image on the display as it is capturing the target image. As shown in FIGS. 11 and 12, this projected image may be a shoe that will be unlocked for the user to purchase. Upon discovering that a tangible item is a target image recognized by the augmented reality program, a user may capture and share an image of the tangible item, including with their friends and through social media platforms. Other users who view the image may than capture the image using augmented reality programs on their mobile devices to unlock access to purchase the consumer item or receive whatever other output the mobile device is configured to perform upon capturing and recognizing the target image.

Through these features, users are encouraged to share target images upon discovering them. For example, if a target image is a menu for a restaurant with limited locations, consumers who do not visit one of the restaurant locations would be unable to capture the menu using augmented reality programs. As such, consumers would otherwise be denied access to purchase consumer products that are unlocked through capturing that menu. However, by encouraging users to share images of the target, users may unlock access to these products without viewing a tangible item that is the target image in real life.

Certain embodiments may also include features to encourage users to share target images with their friends and through social media. For example, users may be granted further access to specific products based on sharing target images a number of times, or having other individuals capture target images they have shared. As other examples, users may be granted sales offers, store credit, consumer products, reward points, or social media rewards.

In some aspects the user interface on the mobile device may include a user input option. When the target image is captured and recognized by the augmented reality program, the user interface display may prompt the user to provide an input to unlock the product. In some aspects after unlocking the product the mobile device may connect to an online store, whereby the user may purchase the unlocked product.

In different embodiments after unlocking and purchasing the product, the user may be encouraged to share information about their purchase, such as through social media. In some examples this may be a predetermined message that states which product the user purchased, and/or where the user found the target image. By sharing this information, the user may instruct other users to seek out the target image. In the example of a restaurant menu, the user's message that they purchased a product that they unlocked through capturing a target image that was a menu, other users interested in unlocking and purchasing the product are encouraged to visit the restaurant or view the menu through other means, such as online or social media. In different examples the user's message about purchasing a product may be shared through social media such as Instagram, Twitter, Facebook, Google+, or any other social media platform.

Further aspects of this disclosure may include communication between the personal device back to the system database. Upon unlocking access to a consumer product and/or finalizing the purchase of that product, the mobile device may communicate information to other mobile devices or to the system database. In some aspects this information may include demographic information about the user, information about the purchase, such as size, color, geographic location of the user, or any other information relating to the user or the purchase. This information may be shared with the seller of the product who may maintain an information database comprising information about the products and users that have successfully unlocked and purchased products through the augmented reality programs.

Aspects discussed in the present disclosure encourage collaboration between sellers and influencers. Influencers may be athletes, chefs, social media personalities, business people, celebrities, etc., that are looking to increase their personal brand, including through social media. As such, influencers who are known for releasing target images that unlock high-demand product are going to increase their followers and social interaction with fans and the public. Relatedly, sellers are able to spread their products, messages, and awareness more organically through influencer releasing target images.

Figure 13:
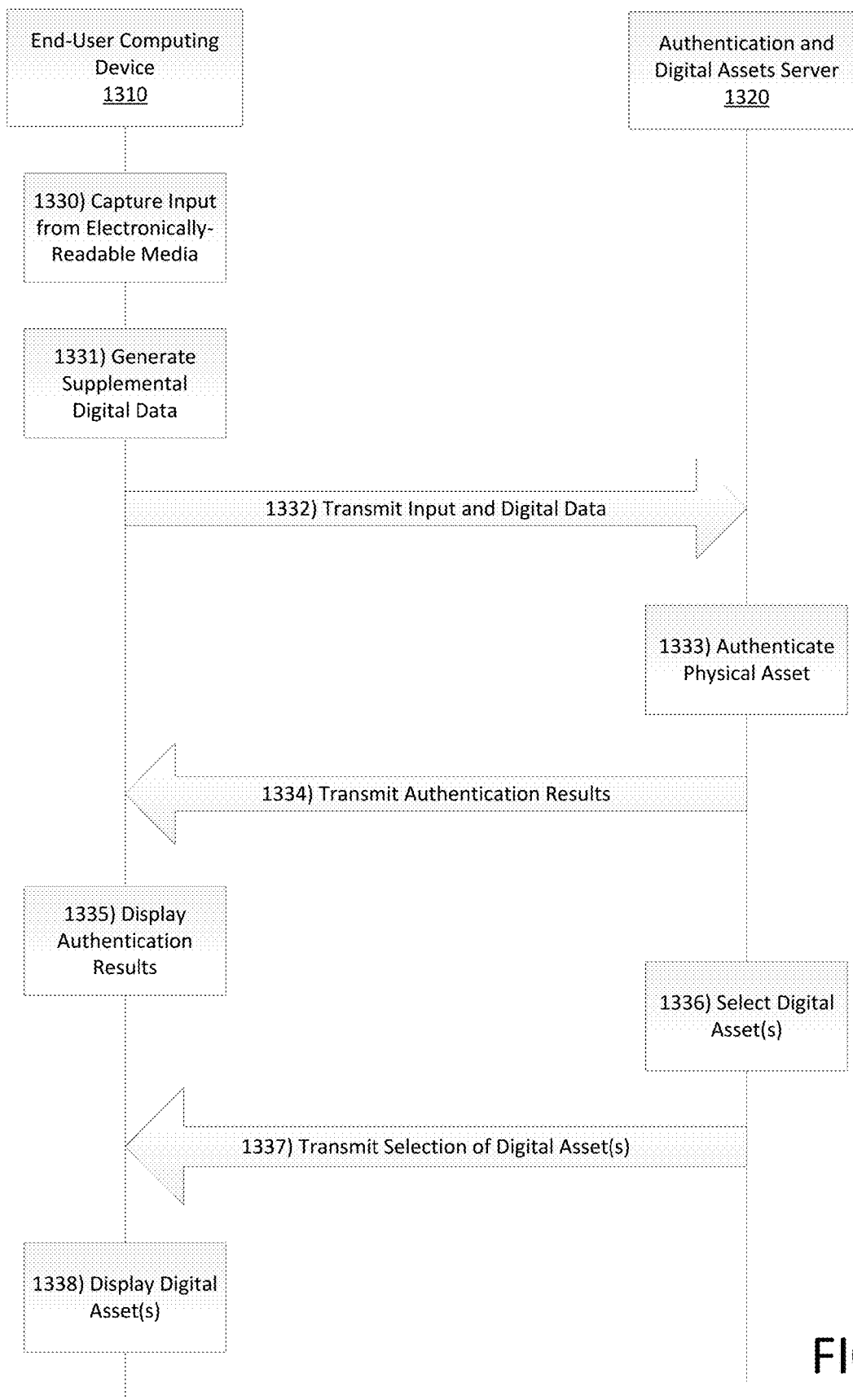
FIG. 13 illustrates another flowchart showing examples of performing steps disclosed in the present disclosure.

FIG. 13 illustrates an exemplary flowchart of steps that certain embodiments may take. The steps shown in FIG. 13 may be executed by an end-user computing device 1310 and an authentication and digital assets server 1320. End-user computing device 1310 and authentication and digital assets server 1320 may be connected and in communication with one another via a network (not shown), such as via an internet connection, via a local area network (LAN), via a wide area network (WAN), etc. End-user computing device 1310 and authentication and digital assets server 1320 may be located remotely from one another. In some aspects end-user computing device 1310 may be a mobile device, such as a cell phone or tablet. Any desired communication link and communication protocol may be used to provide and control the data exchange between end-user computing device 1310 and authentication and digital assets server 1320. Authentication and digital assets server 1320 may comprise one or more server computers that provide data and processing functionality.

At step 1330, end-user computing device 1310 may capture input from an electronically-readable media source. A user may utilize the end-user computing device 1310 to scan a tag embedded in a physical asset, such as an athletic jersey. For example, the physical asset may be embedded with an electronic tag, such as a near-field communication (NFC) tag, a radio-frequency identification (RFID) tag, a QR tag, and/or the like. The electronic tag may be scanned using an image-capturing device of the end-user computing device 1310. The electronic tag may be associated with a unique identification number. Scanning of the electronic tag may result in an input comprising the unique identification number.

At step 1331, end-user computing device 1310 may generate supplemental digital data to supplement the input data received as a result of scanning the embedded electronic tag. The supplemental digital data may comprise any data that may be utilized by authentication and digital assets server 1320 to authenticate the physical asset and/or to select digital assets to be provided to the user once the physical asset has been authenticated. For example, the user may utilize an image-capturing device of the end-user computing device 1310 to capture an image of the physical asset. In another example, end-user computing device 1310 may generate metadata associated with the scanning of the electronic tag. The metadata may include the time of the scanning, the date of the scanning, and/or the location of the end-user computing device 1310 during the scanning. The location of the end-user computing device 1310 may include GPS coordinates of the end-user computing device 1310, a city of the end-user computing device 1310, and/or one or more physical landmarks associated with the GPS coordinates of the end-user computing device 1310 (such as an arena, stadium, brick-and-mortar retail provider, a club zone of the arena, a tailgating location of the arena, etc.).

At step 1332, end-user computing device 1310 may transmit the unique identification number associated with the electronic tag and the supplemental digital data to the authentication and digital assets server 1320. The data may be transmitted via one or more networks and using one or more communication protocols. At step 1333, authentication and digital assets server 1320 may authenticate the physical asset based on the data that authentication and digital assets server 1320 received from end-user computing device 1310. Authentication and digital assets server 1320 may comprise one or more authentication databases storing authentication data. Additionally, or alternatively, in response to receiving the data from end-user computing device 1310, authentication and digital assets server 1320 may access one or more authentication databases. The one or more authentication databases may be stored on a remote server, on a cloud-based computing platform, and the like. The authentication data stored on the authentication databases may comprises unique identification numbers that are associated with authentic physical assets. Accordingly, as a part of step 1333, authentication and digital assets server 1320 may cross-reference the unique identification number received from end-user computing device 1310 with the unique identification numbers stored in the authentication databases.

In addition to the cross-referencing of the unique identification number, authentication and digital assets server 1320 may utilize the supplemental digital data received from the end-user computing device 1310 to authenticate the physical asset. For example, the supplemental digital data may comprise an image of the physical asset, a time of the scanning of the electronic tag, and a location of the end-user computing device 1310 during the scanning of the electronic tag. As a part of the authentication process, authentication and digital assets server 1320 may verify that the physical asset is visible within the image received from the end-user computing device 1310. Authentication and digital assets server 1320 may use one or more image-processing algorithms to isolate the physical asset within the image and to verify that the physical asset within the image matches image data stored at the authentication databases. Authentication and digital assets server 1320 may further verify that the electronic tag was scanned within a predetermined time interval, and/or within a predefined geographical location. For example, based on the unique identification number received from end-user computing device 1310, authentication and digital assets server 1320 may determine that the physical asset was provided to a particular brick-and-mortar retailer at a particular location. Authentication and digital assets server 1320 may then cross-reference the location data received from the end-user computing device 1310 with location data for the retailer (which may be stored on the one or more authentication databases). For example, authentication of the physical asset may be required to be performed within the brick-and-mortar retailer, or within a certain distance from the brick-and-mortar retailer. In another example, authentication and digital assets server 1320 may utilize the location data received from the end-user computing device 1310 to verify that the electronic tag was scanned within a particular city, arena, room in the arena, and/or the like. In this example, the particular city may be the location of a sporting event (i.e., in a game between two different teams, the permitted authentication locations may be a city/arena of the home team and/or a city/arena of the away team).

Further based on the unique identification number received from end-user computing device 1310, authentication and digital assets server 1320 may determine that the physical asset was to be available for purchase after a certain date, or within a certain window of time (i.e., for limited-release physical assets). Authentication and digital assets server 1320 may cross-reference the time/date data received from the end-user computing device 1310 with time/data for the physical asset (which may be stored on the one or more authentication databases). For example, authentication and digital assets server 1320 may verify that the electronic tag was scanned after the physical asset was available for purchase, or shortly after a particular window.

Once authentication and digital assets server 1320 has completed authentication of the physical asset, authentication and digital assets server 1320 may transmit a result of the authentication to end-user computing device 1310 at step 1334. If the authentication was successful, the authentication result transmitted from authentication and digital assets server 1320 to end-user computing device 1310 may indicate a successful authentication. An authentication of a physical asset may be successful if the unique identification number transmitted from end-user computing device 1310 matches a particular unique identification number in the authentication database, if the image sent from end-user computing device 1310 correctly includes an image of the physical asset, if the electronic tag of the physical asset was scanned within a predefined geographical area, and/or if the electronic tag of the physical asset was scanned during a predetermined time or time interval. If the authentication was not successful, the authentication result transmitted from authentication and digital assets server 1320 to end-user computing device 1310 may indicate an unsuccessful authentication. An authentication of a physical asset may be unsuccessful if the unique identification number transmitted from end-user computing device 1310 does not match a particular unique identification number in the authentication database, if the image sent from end-user computing device 1310 does not correctly include an image of the physical asset, if the electronic tag of the physical asset was note scanned within a predefined geographical area, and/or if the electronic tag of the physical asset was note scanned during a predetermined time or time interval.

At step 1335, end-user computing device 1310 may display the authentication result on a display screen of end-user computing device 1310. In one example, the authentication result may be displayed as an overlay on an image of the physical asset. If the authentication of the physical asset was successful, the display of the authentication result may include an icon that, once selected by a user, allows a user to continue interacting with an image of the physical asset, or other available interactive options associated with the physical asset. If the authentication of the physical asset was unsuccessful, the display of the authentication result may include an indication of why the authentication was unsuccessful, and a prompt for user action. For example, if the authentication failed because the scanning was done outside of a predefined geographical area, the display may prompt the user to move to the predefined geographical area. An icon may be displayed which, when selected by the user, may provide additional information regarding the predefined geographical area (for example, if the scanning of the electronic tag for the physical asset may be scanned in a plurality of predefined areas, a predefined geographical area that is closest to the current location of the end-user computing device 1310 may be displayed).

At step 1336, authentication and digital assets server 1320 may determine digital assets to be transmitted to end-user computing device 1310. Step 1336 may be performed concurrently to, prior to, or subsequent to step 1335. Digital assets may include product information, rewards (such as overlays), games, tips, videos, images, prompts for interactions, and the like, that are associated with the physical asset.

Selection of the particular digital assets to be transmitted to the end-user computing device 1310 may be based on one or more of a user profile, a location of the end-user computing device 1310, a time of the scanning of the electronic tag, a location of the scanning of the electronic tag, and/or the physical asset itself. For example, if the physical asset is a basketball jersey, and the electronic tag was scanned/ authenticated on a game day, the digital asset may comprise one or more digital overlays associated with the game, the home team, and/or the away team. In another example, if the physical asset is a basketball jersey, the particular location of the authentication may be utilized to determine the digital assets to be transmitted to the end-user computing device

1310. In this example, if the authentication (i.e., scanning of the electronic tag) was performed within a first geographical area, such as a club zone within an arena, a first digital asset (or first set of digital assets) may be transmitted to the end-user computing device 1310. Further in this example, if the authentication of the physical asset was performed within a second geographical area, such as within the arena but outside of the club zone, a second digital asset (or second set of digital assets) may be transmitted to the end-user computing device 1310. Further in this example, if the authentication of the physical asset was performed within a third geographical area, such as within a tailgating location outside of the area, a third digital asset (or third set of digital assets) may be transmitted to the end-user computing device 1310. Additional or alternative geographical locations may include a city of the home team, a city of the away team, an authorized retailer of the physical asset, particular restaurants/bars, and the like.

As indicated above, a user profile may be additionally or alternatively used to select the digital asset(s) to be transmitted to the end-user computing device 1310 in response to successful authentication of the physical asset. For example, authentication of the physical asset may be linked to a particular user of end-user computing device 1310 (discussed in detail below in reference to FIGS. 14A-D). Authentication and digital assets server 1320 may analyze the user profile to select digital assets that are tailored to the user's preferences, are most likely to be utilized by the user, and the like. For example, the user profile may include information indicating the user's preferences to particular digital assets. In this example, authentication and digital assets server 1320 may transmit these particular digital assets to end-user computing device 1310. In another example, the user profile may include activity information for the user, such as information indicating that the user regularly participates in particular sports leagues, or runs marathons, or the like. In this example, authentication and digital assets server 1320 may select digital assets that are tailored to the particular activities that the user participates in—for example, if the user participates in weekly soccer games, the digital assets may include one or more digital overlays comprising soccer-related imagery or data. In another example, the user profile may store historical information relating to additional successful authentications completed by the user, previous digital assets transmitted to the end-user computing device 1310 based on those authentications, user interactions with those previous digital assets, and the like. For example, the user associated with the successful authentication of the physical asset may have successfully authenticated one or more additional physical assets in the past. In this instance, the digital assets transmitted to end-user computing device 1310 may be digital assets reserved for users that have authenticated multiple physical assets. These digital assets may be associated with higher-level rewards, such as overlays that require less subsequent interactions before becoming eligible for physical rewards. Further in this example, in response to those previous authentications, the user may have received a plurality of digital assets. The historical information in the user profile may include information on which of those digital assets the user had the most interaction with. Authentication and digital assets server 1320 may use this historical information to select digital assets that are similar to those that the user has a history of active engagement with.

The user profile stored for the user at authentication and digital assets server 1320 may further receive information from one or more devices (such as devices 112, 126, 128, and/or 130) associated with the user. Once the physical asset has been successfully authenticated, authentication and digital assets server 1320 may retrieve activity data from the one or more devices to determine if the user is participating in any athletic or sporting events. For example, authentication and digital assets server 1320 may determine, based on information in the user profile and information retrieved from the one or more devices, that the user is participating in a marathon. In this instance, authentication and digital assets server 1320 may select digital assets that are reserved for users that are participating in sporting events during authentication or within a particular time period following authentication of the physical asset. In the instance of the user participating in a marathon, the physical asset authenticated by the user may include a pair of running shoes, and the digital assets transmitted from authentication and digital assets server 1320 to end-user computing device 1310 may include an overlay showing the shoes being knitted over a body part of the user, such as the user's feet. Further in this example, the digital assets may be tailored to the results of the user's participation. For example, a plurality of participants in the marathon may have authenticated physical assets prior to the marathon. A first participant of the plurality of participants may have placed the highest among the plurality of participants, and authentication and digital assets server 1320 may select a first digital asset to transmit to an end-user computing device 1310 associated with the first participant. A second participant of the plurality of participants may have placed second among the plurality of participants, and authentication and digital assets server 1320 may select a second digital asset to transmit to an end-user computing device associated with the second user. The first digital asset may require less interaction from the user prior to becoming eligible for a physical reward. The use of two different digital assets is for exemplary purposes only, and additional differing digital assets may be transmitted to end-user computing devices associated with different users, based on the performance results of those users.

In addition to sending one or more digital assets at the time of authentication, authentication and digital assets server 1320 may transmit one or digital assets that may accessed by a user at a future time. For example, upon successful authentication of a basketball jersey, authentication and digital assets server 1320 may send a plurality of digital assets to end-user computing device 1310. A first set of these digital assets may be immediately utilized by a user of end-user computing device 1310. A second set of these digital assets may be utilized by a user of end-user computing device 1310 at a first specified time and/or date (for example, during a first sporting event associated with the physical asset). A third set of these digital assets may be utilized by a user of end-user computing device 1310 at a second specified time and/or date (for example, during a second sporting event associated with the physical asset). In one instance, authentication and digital assets server 1320 may transmit a first set of digital assets to end-user computing device 1310 upon authentication of a physical asset, and may send additional digital assets associated with the physical asset at later days and/or times.

Figure 15:
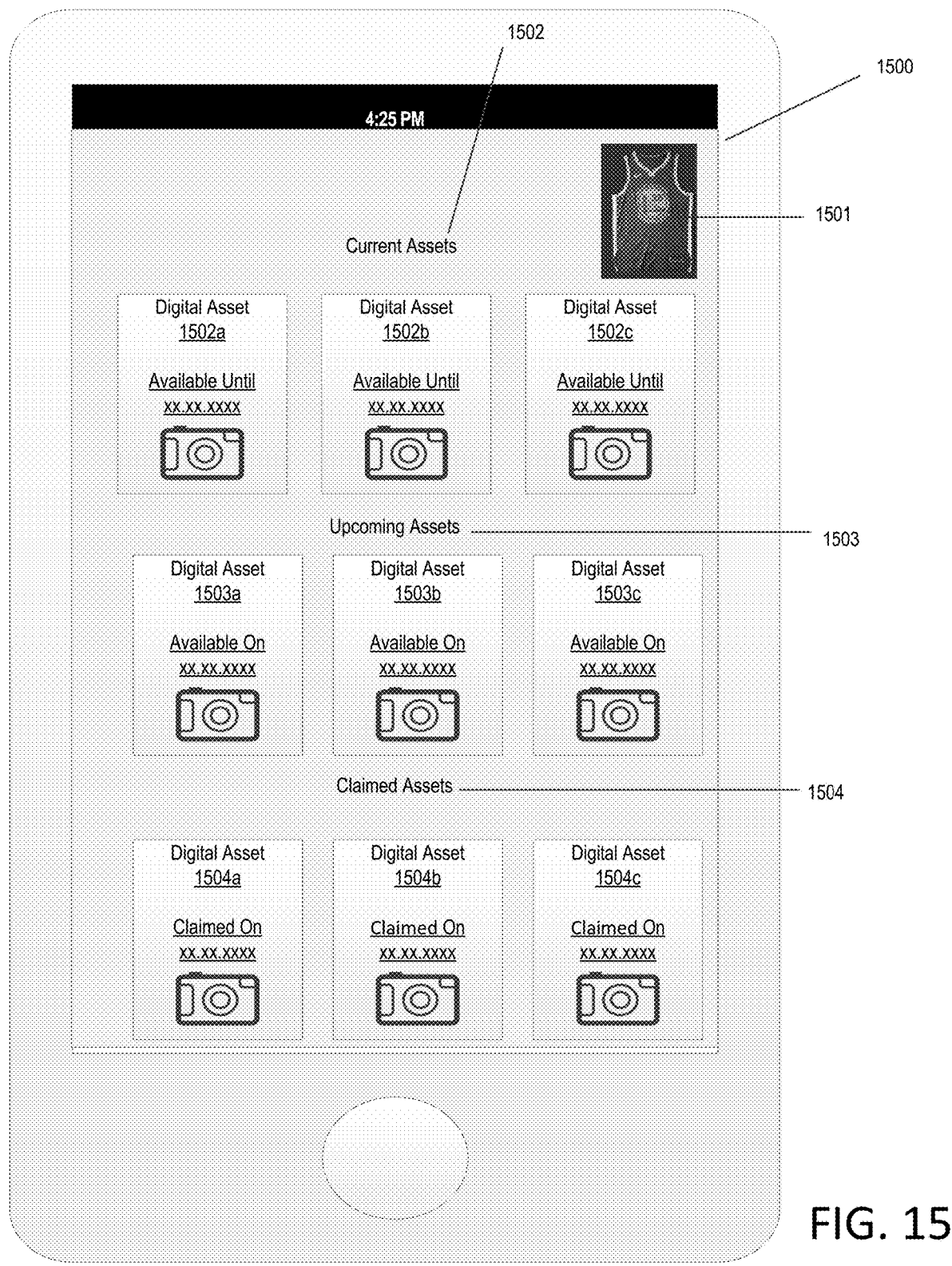
FIG. 15 illustrates an example of a display that may be utilized in the present disclosure.

At step 1337, authentication and digital assets server 1320 may transmit the selected digital assets to end-user computing device 1310. At step 1338, end-user computing device 1310 may display the digital assets to a user of end-user computing device 1310. In one example, the display of the digital assets may be similar to the display of digital assets discussed in detail below with reference to FIG. 15.

Referring back to step 1333, once authentication and digital assets server 1320 determines whether or not the physical asset is authenticated, authentication and digital assets server 1320 may update a master physical assets authentication database (not shown). The master physical assets authentication database may be stored locally at authentication and digital assets server 1320 or remotely (i.e., at a cloud-based storage system). The master physical assets authentication database may be utilized to detect counterfeit retailers, or highlight authorized retailers. The data stored at the master physical assets authentication database may be analyzed to determine the identify of counterfeit or authentic retailers. For example, if authentication and digital assets server 1320 frequently receives multiple authentication requests from a particular location, and those authentication requests all include a same invalid code, or different invalid codes, authentication and digital assets server 1320 may determine that counterfeit physical assets are being sold at the particular location. In another example, if authentication and digital assets server 1320 frequently receives multiple authentication requests from a particular location, and those authentication requests all include scans from valid electronic tags, authentication and digital assets server 1320 may determine that authentic physical assets are being sold at the particular location. Authentication and digital assets server 1320 may in turn award a user of end-user computing device 1310 a digital asset in return for sharing information about the particular location on a social-media platform. Additionally, or alternatively, a retailer at the particular location may be awarded credentials identifying the retailer as selling authentic physical assets.

Figure 14A:
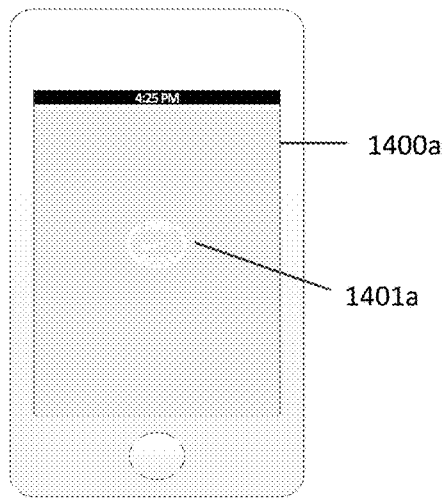
FIGS. 14A-D illustrate examples of the displays that may be utilized in the present disclosure.

FIGS. 14A-14D illustrate user interfaces that may be displayed on an end-user computing device 1310 prior to, during, and/or subsequent to authentication of a physical asset. FIG. 14A illustrates a user interface screen 1400a that may be displayed to the user on end-user computing device 1310 immediately following the scanning of an electronic tag. The user interface screen may be generated and displayed by an application executing on end-user computing device 1310. In one instance, a user may launch the application prior to scanning the electronic tag. In this instance, the user may be prompted to create an account or enter login credentials. If the user has previously created an account and entered login credentials, the application may be configured to automatically remember the user, i.e., to store and use the previously entered credentials. Element 1401a of the user interface screen 1400a may be a loading animation. A message (not shown) may be displayed as part of user interface screen 1400a, and the message may indicate that information related to the electronic tag and/or physical asset is currently loading.

Figure 14B:
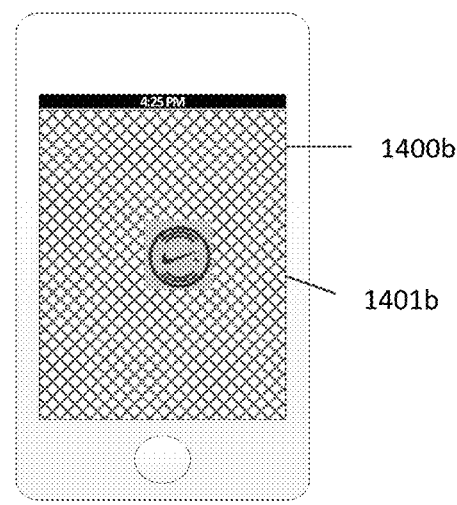
Figure 14C:
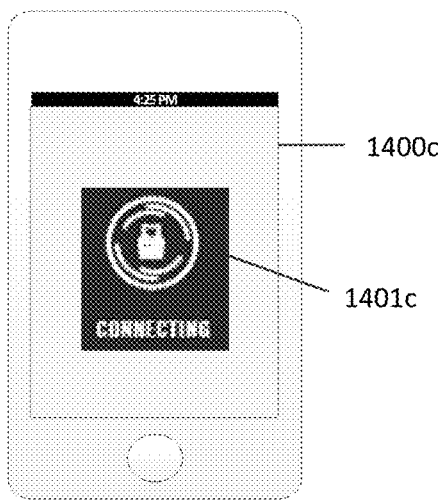
Figure 14D:
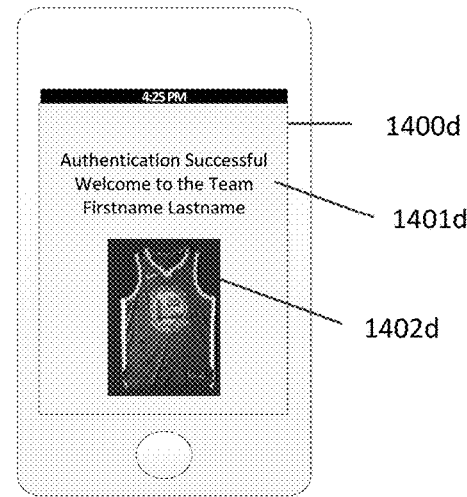

Once end-user computing device 1310 has completed loading information related to the electronic tag and/or physical asset, end-user computing device 1310 may display user interface screen 1400b, shown in FIG. 14B. User interface 1400b may differ from user interface screen 1400a in terms of colors, patterns, and the like. For example, if the physical asset is a basketball jersey, element 1401b may be displayed in the team colors of the team associated with the physical asset. Once end-user computing device 1310 begins authentication of the physical asset based on the scanned electronic tag (for example, steps 1331-1334 shown in FIG. 13), end-user computing device 1310 may display user interface 1400c, shown in FIG. 14C. User interface 1400c may include element 1401c, which may indicate that the authentication of the physical asset is in progress. Once authentication is complete, end-user computing device 1310 may display user interface 1400d, shown in FIG. 14D. In this example, authentication of the physical asset was successful. Element 1401d may include a message indicating successful authentication, and a name of the user of end-user computing device 1310 may be dynamically displayed within element 1401d. User interface 1400d may further include element 1402d, which may be an image of the authenticated physical asset (shown in FIG. 14A as a basketball jersey).

The user may scroll down user interface 1400d to view user interface 1500. User interface 1500 may include element 1501, which may be an image of the authenticated physical asset. User interface 1500 may further include element 1502, which are digital assets associated with the authenticated physical asset and currently available for claiming. Each of digital asset 1502a, 1502b, and 1502c are digital assets that are associated with the authenticated physical asset and that are currently available for claiming. The icons for digital asset 1502a, 1502b, and 1502c may include a preview of the digital asset (such as an image of the digital asset), and information identifying the date until which the digital asset may be claimed. For example, each of digital assets 1502a, 1502b, and 1502c may be different overlays associated with the authenticated physical asset. Digital asset 1502a may be a game day overlay that is available only on a particular game day. Digital asset 1502b may be a team overlay that is available during the entire basketball season. Digital asset 1502c may be a pre-season overlay that is available only during pre-season.

User interface 1500 may further include element 1503, which are digital assets associated with the authenticated physical asset and but will not be available for claiming until a future date. Each of digital asset 1503a, 1503b, and 1503c are digital assets that are associated with the authenticated physical asset and that will be available for claiming until a future date. The icons for digital asset 1503a, 1503b, and 1503c may include a preview of the digital asset (such as an image of the digital asset), and information identifying the date on which the digital asset may be claimed. For example, each of digital assets 1503a, 1503b, and 1503c may be different overlays associated with the authenticated physical asset. Digital asset 1503a may be a game day overlay that will be available on a future game day. Digital asset 1503b may be a halftime or post-game overlay that will be available at halftime of a currently ongoing basketball game or once the game is complete. Digital asset 1503c may be a post-season overlay that will be available during pro-season games.

User interface 1500 may further include element 1504, which are digital assets associated with the authenticated physical asset and that have already been used by the user. Each of digital asset 1504a, 1504b, and 1504c are digital assets that are associated with the authenticated physical asset and that have been claimed by the user. The icons for digital asset digital asset 1504a, 1504b, and 1504c may include a preview of the digital asset (such as an image of the digital asset), and information identifying the date on which the digital asset were claimed.

Although elements 1502, 1503, and 1504 are shown simultaneously on user interface 1500, only portions of user interface 1500 may be shown on end-user computing device 1310 depending on a size of the display screen. The user of end-user computing device 1310 may scroll up or down on the screen to continue viewing non-displayed portions of user interface 1500. Selection of a displayed digital asset may result in display of a user interface (not shown) showing additional information for that particular digital asset. The additional information may include a number of interactions with that digital asset, dates of those interactions, a number of interactions needed before the user may be eligible for a physical reward, details regarding the physical reward, and the like. In one example, digital assets that are not currently available for interaction (for example, digital assets 1503a, 1503b, and 1503c and/or digital asset 1504a, 1504b, and 1504c) may be grayed out to indicate that the assets are not currently available for interaction.

Figure 16:
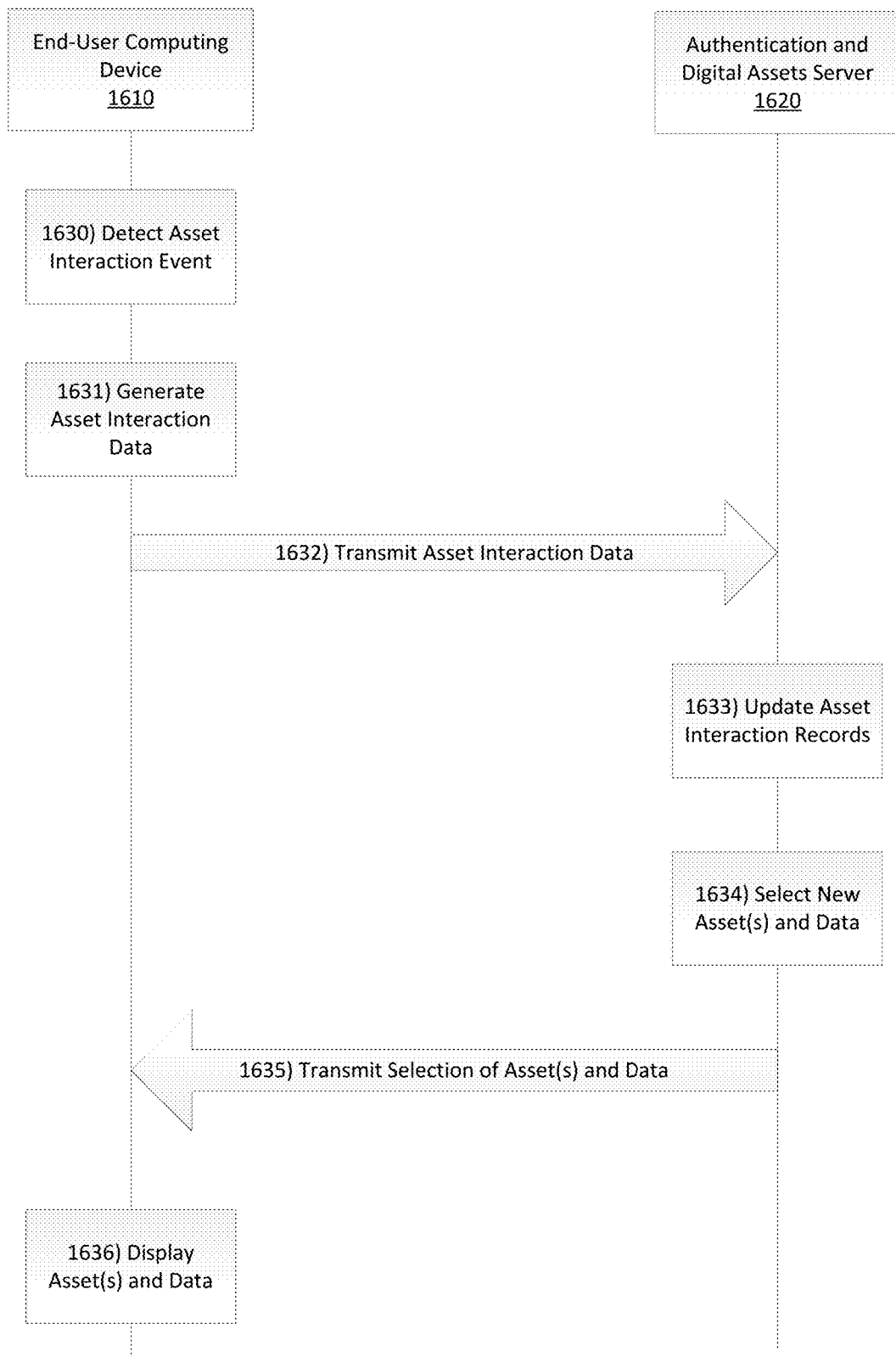
FIG. 16 illustrates another flowchart showing examples of performing steps disclosed in the present disclosure.

FIG. 16 an exemplary flowchart of steps that certain embodiments may take. The steps shown in FIG. 16 may be executed by an end-user computing device 1610 and an authentication and digital assets server 1620. End-user computing device 1610 and an authentication and digital assets server 1620 may correspond to end-user computing device 1310 and authentication and digital assets server 1320 as discussed above in reference to FIG. 13. At step 1630, end-user computing device 1610 may detect an asset interaction event. An asset interaction event may comprise a user interaction with a physical asset or a digital asset associated with a physical asset. A user interaction event associated with a physical asset may comprise a user scanning an electronic tag of a physical asset via the end-user computing device 1610. A user may scan an electronic tag of a physical asset to authenticate the asset or to check-in at a particular location or event. A user interaction event associated with a digital asset may begin with a user selecting a digital asset displayed to a user on a user interface display of end-user computing device 1610. For example, referring back to FIG. 15, a user interaction with a digital asset may begin with the user selecting digital asset 1502a. The specific actions necessary to complete a user interaction with a digital asset may be different depending on the particular digital asset. In this instance, digital asset 1502a may be a game day overlay that is available only on a particular game day, and an asset interaction event associated with the digital asset may be complete once the user takes an image with end-user computing device 1610, adds the overlay of digital asset 1502 onto the image, and shares the overlaid image (i.e., via a messaging platform, a social-media platform, or the like).

At step 1631, end-user computing device 1610 may generate asset interaction event data for the detected asset interaction event. The asset interaction event data may include information regarding the user (i.e., user authentication credentials or the like), physical asset, the digital asset, the time of the interaction, the location of the interaction, the type of interaction, etc. At step 1632, end-user computing device 1610 may transmit asset interaction event data to authentication and digital assets server 1620. End-user computing device 1610 may transmit the asset interaction event data using any number of suitable communication protocols and networks.

At step 1633, authentication and digital assets server 1620 may update asset interaction records. The asset interaction records may be stored locally at authentication and digital assets server 1620 or remotely (for example, on a cloud server platform). Each user may be associated with an individual asset interaction record. The asset interaction record for a user may include separate records for each physical asset authenticated by the user via authentication and digital assets server 1620. If the asset interaction event detected by end-user computing device 1610 is authentication of a new physical asset, authentication and digital assets server 1620 may create a new record within the individual asset interaction record for the user. If the asset interaction event detected by end-user computing device 1610 is an interaction with a previously authenticated physical asset (for example, a user checks in at a basketball game by scanning an embedded electronic tag in his/her basketball jersey at the arena), authentication and digital assets server 1620 may update an already existing record associated with the previously authenticated physical asset. If the asset interaction event detected by end-user computing device 1610 is an interaction with a digital asset, authentication and digital assets server 1620 may update the appropriate record (i.e., the record for the physical asset associated with the digital asset) with the interaction event data.

Updating the asset interaction record may comprises performing analysis on the asset interaction data received from the end-user computing device 1610. For example, if the asset interaction data included an image (i.e., the asset interaction event was an image overlaid with a digital asset), authentication and digital assets server 1620 may determine whether the overlaid image includes an image of the physical asset associated with the overlay (digital asset). Authentication and digital assets server 1620 may utilize one or more image recognition algorithms in making this determination.

At step 1634, authentication and digital assets server 1620 may determine, based on the updated asset interaction record, whether the user of end-user computing device 1610 is eligible for updated digital assets and/or a physical reward. Different interaction events with physical assets and digital assets may each be worth a predefined number of points, and the asset interaction record may track the number of points the user has earned for each physical asset (and its associated digital assets). For example, if a user of end-user computing device 1610 check-in at a predetermined number of home games by scanning an embedded electronic tag of a physical asset, the user may be rewarded with a physical award (such as a limited-edition basketball jersey). In this example, if authentication and digital assets server 1620 determines that the user has completed the required number of check-ins, authentication and digital assets server 1620 may send a description of the rewarded physical asset and information on how the user may retrieve the rewarded physical asset to end-user computing device 1610 at step 1635. Further in this example, if authentication and digital assets server 1620 determines that the user has not completed the threshold number of check-ins, authentication and digital assets server 1620 may determine the number of check-ins that the user must still complete to be rewarded with a physical asset, and transmit this information to end-user computing device 1610 at step 1635.

In another example, if a user has a certain number of interactions with a digital asset, or a certain number of interactions with a set of digital assets, a user may be rewarded with a new digital asset, or a new physical asset. For example, if a user takes and shares a threshold number of images with a particular overlay or particular set of overlays, the user may be rewarded with a new overlay, or a new physical asset (for example, a pair of shoes, an item of clothing, or the like).

Authentication and digital assets server 1620 may assign different weights to different types of interactions with digital assets. For example, sharing an overlaid image via a first platform (i.e., a social-media platform) may be given a higher weight than sharing an overlaid image with a single individual via a text message. In another example, the interaction may be weighted based on the number of additional users that view the interaction. For example, if a user has a first number of followers on a first social media platform and a second number of followers on a second social media platform, asset interaction events associated with the first social media platform may be more heavily weighted than asset interaction events associated with the second social media platform (i.e., sharing an overlaid image on the first social media platform may result in the user earning a first number of points and sharing an overload image on the second social media platform may result in the user earning a second number of points, wherein the first number of points may be higher than the second number of points). Such a weighted system encourages users to share overlaid images on social media platforms on which they have a large following, thereby increasing the exposure of the overlays. In another example, sharing an overlaid image that includes the physical asset associated with the overlay may be worth more points than sharing an overlaid image that does not include the physical asset.

In yet another example, the time and/or location of the interaction may determine with the weight assigned to the asset interaction event. For instance, checking-in at an arena prior to tip-off by scanning an embedded electronic tag of a physical asset may be assigned more points than checking-in outside the area after half-time. In another instance, sharing an overlaid image to a social media platform on game day (and/or prior to completion of the game) may be assigned more points than sharing the overlaid image the day after the sporting event (and/or after the event is already complete).

Accordingly, determining, based on the updated user interaction record, whether the user of end-user computing device 1610 is eligible for updated digital assets and/or a rewarded physical asset may comprises summing the number of points for a record associated with the asset interaction event. For example, the user of end-user computing device 1610 may have authenticated three different physical assets. The asset interaction event at step 1630 may be associated with a first physical asset (i.e., checking-in by scanning an electronic tag of the first physical asset, sharing an image with an overlay associated with the first physical asset, etc.). Once the authentication and digital assets server 1620 has updated a first record associated with the first physical asset based on the type of interaction, authentication and digital assets server 1620 may analyze the number of points the user has accumulated for the first physical asset. Authentication and digital assets server 1620 may then compare the number of accumulated points to various points requirements for different digital assets and physical assets. Based on these comparisons, authentication and digital assets server 1620 may determine if the user is to be rewarded with any new digital assets and/or physical assets. In one instance, the number of accumulate points may be determined using the first record (i.e., the record associated with the first physical asset). In another instance, the number of accumulated points may be determined using all of the records associated with the user (i.e., the records of all physical assets authenticated by the user).

At step 1635, authentication and digital assets server 1620 may transmit, to end-user computing device 1610, one or more rewarded digital assets, information about one or more rewarded physical assets, and/or information about a remaining number of points the user of end-user computing device 1610 must earn in order to be rewarded additional digital and/or physical assets. The information about one or more rewarded physical assets may include a description of the rewarded physical asset(s), a list of retail locations at which the user may collect the rewarded physical asset(s), and the like. In one instance, if the user only needs to accumulate a few points (i.e., less than a predetermined threshold value), authentication and digital assets server 1620 may select one or more digital assets to transmit to end-user computing device 1610. The one or more digital assets may be specifically selected based on a determination that the user is likely to interact with those digital assets and earn the remaining number of points.

If authentication and digital assets server 1620 is transmitting a plurality of assets to end-user computing device 1610, authentication and digital assets server 1620 may instruct end-user computing device 1610 to inform the user of rewarded high-priority assets before informing the user of rewarded low-priority assets. In one instance, rewarded physical assets may be deemed to be high-priority. Accordingly, if authentication and digital assets server 1620 determines that the user is to be rewarded a physical asset and a digital asset, authentication and digital assets server 1620 may instruct end-user computing device 1610, at step 1635, to emphasize the rewarded physical asset over the rewarded digital asset. If authentication and digital assets server 1620 has determined that a user is eligible to select from a plurality of physical assets, authentication and digital assets server 1620 may instruct end-user computing device 1610 to prioritize display of certain eligible physical assets over eligible physical assets.

The priorities of each of the plurality of physical assets may be determined based on one or more factors, such as, but not limited to, a current location of end-user computing device 1610, a user profile, user preferences, and the like. For example, if the user has recently checked-in at an arena, and a first physical asset of the plurality of physical assets may be collected within the arena, the first physical asset may be given priority over the remaining physical assets. In another example, if the user has an online wish list, and a first physical asset of the plurality of physical assets is on the wish list, the first physical asset may be given priority over the remaining physical assets. In another example, if the user has frequently checked-in at a particular retailer, rewarded physical assets that may be collected at the particular retailer may be given priority over the remaining physical assets. In another example, if the plurality of physical assets can be redeemed online, and the user has a history of viewing (or searching for) a first physical asset of the plurality of physical assets, the first physical asset may be given priority over the remaining physical assets. Authentication and digital assets server 1620 may assign a higher priority to any rewarded physical asset that is likely to increase engagement with the user, and that is likely to be redeemed by the user.

At step 1636, end-user computing device 1610 may display information identifying the rewarded physical asset(s) and/or the rewarded digital asset(s), or may display information identifying the number of points the user needs to earn in order to be rewarded a physical and/or digital asset. If the user has been awarded a physical asset, end-user computing device 1610 may display an image of the physical asset, and a list of nearby locations at which the rewarded physical asset may be redeemed. In one instance, the rewarded physical asset may be redeemed online. In this instance, the information may include a link to a website and a code that the user may enter at the website in order to redeem the rewarded physical asset. If the user is eligible to select a physical asset from a plurality of physical assets, end-user computing device 1610 may display the physical assets in an order determined by authentication and digital assets server 1620. The order may have been determined based on characteristics of the physical assets, or a user profile of the user.

Figure 17:
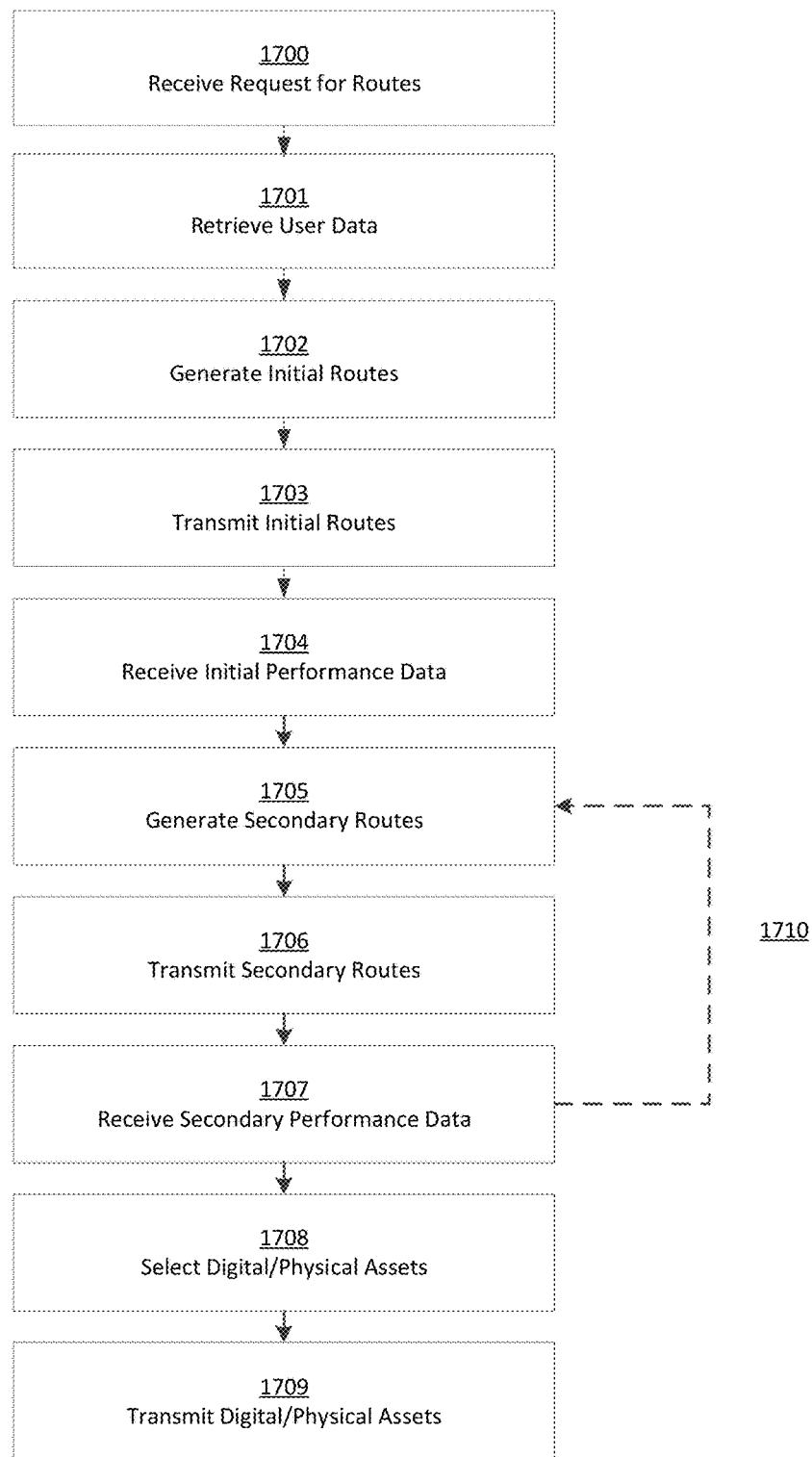
FIG. 17 illustrates another flowchart showing examples of performing steps disclosed in the present disclosure.

FIG. 17 an exemplary flowchart of steps that certain embodiments may take. The steps shown in FIG. 17 may be performed by a computing system, such as server 111. At step 1700, processor 202 of server 111 may receive a request to generate a plurality of routes for a plurality of users. The request may identify each of the plurality of users, and may further identify an end-user computing device 1310 associated with each of the users. The request may include one or more constraints from the plurality of routes, such as location constraints, length constraints, geographical constraints (for example, peak altitude, and the like), difficulty level, and the like. The constraints may be applicable to all of the routes to be generated, or may be applicable to a subset of routes to be generated. The plurality of routes may be generated for a scavenger hunt that the plurality of users are participating in.

At step 1701, processor 202 may retrieve user data from memory 212 of system 111. Processor 202 may retrieve separate user data for each of the plurality of users. The user data may comprise athletic data including, but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

At step 1702, processor 202 may generate a plurality of initial routes for the plurality of users. Processor 202 may generate a customized initial route for each user, and one or more users may have the same customized initial routes. The plurality of initial routes may be generated based on the constraints included in the request received at step 1700 and the user data retrieved at step 1701. For example, the constraints may specify a plurality of potential starting locations for the initial routes, and maximum distance or completion time for the initial routes. Processor 202 may generate a plurality of routes that each begin at one of the potential starting locations, and that each meet the maximum distance and/or completion time requirements. The route generated for each user may be customized in terms of starting location, completion time, distance, difficulty, and the like, based on the user data retrieved for that user. That is, the user's individual route may be handicapped based on the user's prior athletic data. For example, each initial route may require special athletic moves or abilities, such as jumping, running, climbing, etc. Users who have demonstrated a high level of athletic ability (based on their user data) may be expected to traverse a longer distance, and/or a more difficult topography (for example, uphill routes), and/or complete the routes in a shorter amount of time. Each of the plurality of users must complete their customized route within a specified time period, or reach a specified location by a specified time. In one instance, the plurality of users may be given different start times based on an expected completion time for each user, such that the users each complete their customized initial route at a same completion time, or within a same completion time window.

At step 1703, processor 202 may transmit the plurality of routes to the plurality of users. As noted above, the request received at step 1700 may identify end-user computing devices associated with the plurality of users. Accordingly, processor 202 may send, to each user, via their identify end-user computing device, the customized route generated for that user. Processor 202 may further send a start time to each user. At step 1704, processor 202 may receive performance results for each of the plurality of users. The performance result for each user may indicate whether the user completed the initial route, a completion time, and the user's performance data for the initial route. The performance data for the initial route may include information similar to the athletic data retrieved at step 1701.

At step 1705, processor 202 may generate secondary routes. In one instance, secondary routes may be generated for each of the plurality of users, regardless of whether each user completed their customized initial route. In another instance, secondary routes may be generated for only a subset of users. The subset of users may be those users that completed their initial routes. The secondary routes may be generated based on the constraints received at step 1700, the user data retrieved at step 1701, the initial routes generated at 1702, and the initial performance data received at step 1704. For example, the secondary routes may begin where the initial routes ended. The customary routes may include activities that are similar to those included in the initial route, and/or may include different activities. For example, if the initial route for a first user included a plurality of hills, the secondary route generated for that user may include only a few hills, or no hills.

The secondary routes may be customized for each user based on the user data retrieved for the users at step 1702, and the initial performance data received for the users at step 1704. For example, first user data for a first user may indicate that the first user excels at uphill climbs. First initial performance data for the first user may further indicate that the first user had a strong running pace. Second user data for a second user may indicate that the second user has limited experience with uphill climbs, and second initial performance data for the second user may further indicate that the second user had a slow running pace compared to the first user. Processor 202 may utilize these factors when generating the secondary route for the first user and the second user. A first secondary route generated for the first user may include a first number of uphill climbs, and the first user may be required to set a first running pace for particular portions of the first secondary route. A second secondary route generated for the second user may include a second number of uphill climbs, and the second user may be required to set a second running pace for particular portions of the second secondary route. As the first user historically excels at uphill climbs and had a fast running rate during the initial route, the first number of uphill climbs may be greater than the second number of uphill climbs, and the first running pace may be greater than the second running pace.

The use of two users is exemplary, and more than two customized running routes may be generated. By generating different customized secondary routes for each user, and setting different requirements for the users during portions of the secondary routes, processor 212 may handicap each user based on their athletic data and their performance during their initial routes. This helps to create a level playing field among all participants of the scavenger hunt.

The secondary routes may further be customized based on user preferences. For example, the first user may have indicated that they are working on improving their running pace, and the second user may have indicated that they are working on improving their uphill climbs. A first customized secondary route generated for the first user may include long stretches of flat roads, thereby allowing the first user the opportunity to improve their running pace. Similarly, a second customized secondary route generated for the second user may include multiple hills, thereby allowing the second user the opportunity to improve their uphill climbs.

At step 1706, processor 202 may transmit the customized secondary routes to their corresponding user via end-user computing devices associated with the user. At step 1707, processor 202 may receive performance data for each user. The performance data for each user may include athletic data indicating the user's performance on the customized secondary route. In one instance (shown at element 1710), the steps of receiving performance data, generating additional routes, and transmitting the additional routes to the user may be repeated one or more times. The number of cycles may depend on how long the scavenger hunt is to continue. Once the hunt is complete, at step 1708, processor 202 may select one or more digital and/or physical assets as rewards for the users. The selection of the assets may be based on the performance data received for the users during completion of the routes of the hunt. In one instance, processor 202 may award a digital asset to all participants. In another example, users who achieved a first performance level may be awarded a first digital and/or physical asset, users who achieved a second performance level may be awarded a second digital and/or physical asset, and so on. In another example, top performers may be awarded physical asset(s), and the remaining users may be awarded digital asset(s). At step 1709, processor 202 may transmit information regarding the rewarded digital and/or physical assets to the users via their end-user computing device. If a user has been rewarded a physical asset, the information sent to their end-user computing device may include an image of the asset, and instructions on how the physical asset may be collected by the user.

Figure 18:
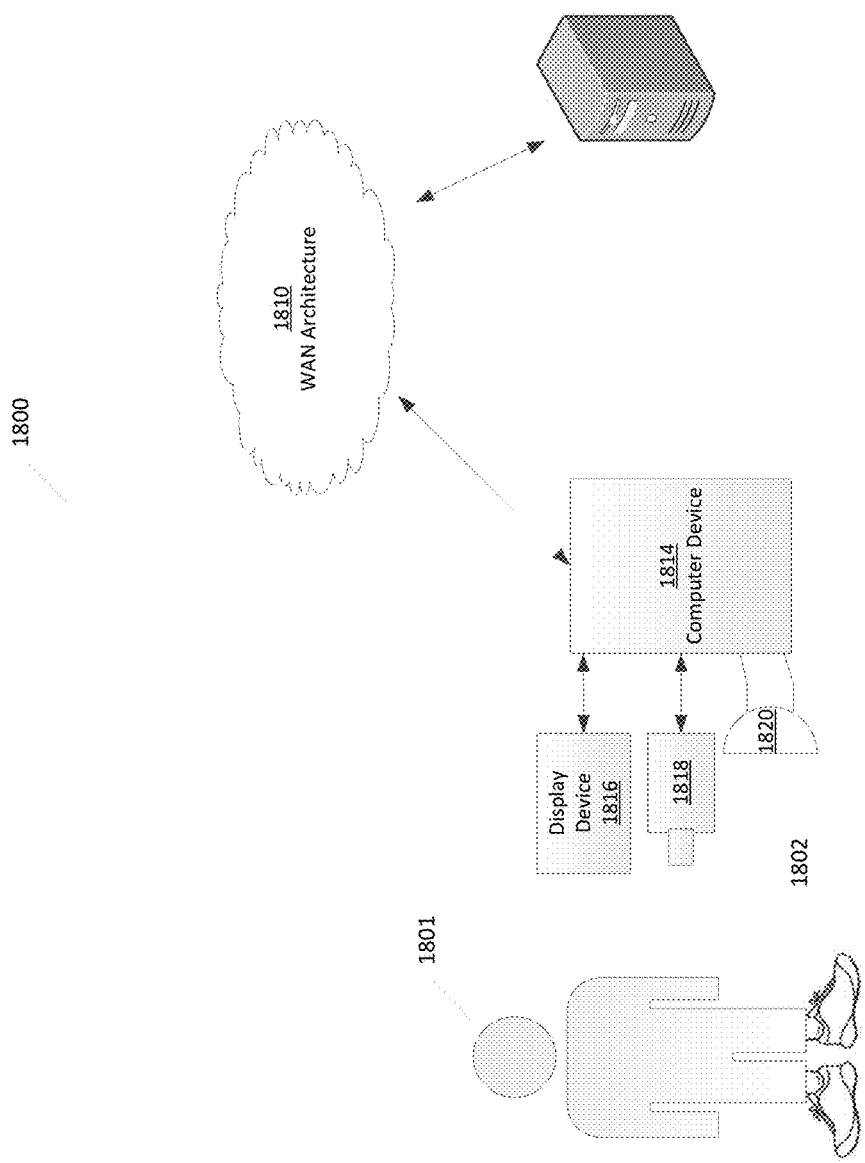
FIG. 18 illustrates an example of an apparel authentication and analysis system 1800 in accordance with example embodiments.

FIG. 18 illustrates an example of an apparel authentication and analysis system 1800 in accordance with example embodiments. Apparel authentication and analysis system 1800 may include one or more a user wearing a physical asset, such as shoes 1802. Computer device 1814 is shown in operative communication with a display device 116, an image-capturing device 1818, and sensor 1820. In one embodiment, display device 1816 may provide audio-visual cues to user 1801 to perform a specific athletic movement. The audio-visual cues may be provided in response to computer-executable instruction executed on computer device 1814 or any other device. Display device 1816 may be a touchscreen device or otherwise configured to receive a user-input. Display device 1816, image-capturing device 1818, and sensor 1820 may correspond to display device 116, image-capturing device 118, and sensor 120 as described in reference to FIG. 1, and may have the same or similar functionalities. Apparel authentication and analysis system 1800 may further include WAN Architecture 1810 and server 1811, which may correspond to and have similar functionalities as WAN Architecture 110 and server 111, respectively.

In one embodiment, data may be obtained from image-capturing device 1818 and/or other sensors, such as sensor 1820, which may be used to detect (and/or measure) athletic parameters, either alone or in combination with other devices, or stored information. The user may instruct image-capturing device 1818 to capture an image of a specific element, such as physical asset 1802 (i.e., a pair of sneakers). The user may transmit the image of the physical asset to server 1811 via one or more of the display device 1816 and computer device 1814. The user may additionally transmit instructions to server 1811. In one example, the instructions may comprise a request for authentication of the physical asset 1802 based on the image. In this example, server 1811 may utilize one or more optical analysis algorithms to verify that physical asset 1802 is authentic. Server 1811 may return the authentication results to computer device 1814, and the results may be output on display device 1816.

In another example, the instructions may comprise a request for feedback on physical asset 1802. For example, as noted above and in reference to FIG. 1, athletic data may be received from the user via sensor 1820, image-capturing device 1818, and/or display device 1816. In addition, an image of the user may be obtained via image-capturing device 1818. The athletic data and the image of the user may be transmitted to server 1811. Server 1811 may perform different types of analysis on the image and athletic data to provide feedback to user 1801. For example, server 1811 may analyze the athletic data to determine an athletic activity being performed by the user (for example, yoga). Server 1811 may then access one or more databases to determine optimal apparel and/or equipment for the user 1801 for the specific athletic activity. For example, if server 1811 determines that user 1801 is performing yoga, server 1811 may select yoga-specific apparel and equipment (such as a yoga shirt, yoga mat, and the like) to be recommended to user 1801. Server 1811 may additionally analyze the image of user 1801 to determine apparel/equipment currently being utilized by user 1801 while performing the athletic activity. Server 1811 may then utilize this data when selecting the specific products to recommend to the user. For example, if the user is already wearing a yoga shirt, server 1811 may select yoga pants to recommend to the user. In another example, server 1811 may additionally or alternatively crowd-source the determination of products to be recommended to the user. Server 1811 may then transmit image and product data for the selected products to computer device 1814. Computer device 1814 may then display the images and product data on display device 1816.

The invention claimed is:

1. A method comprising:
    capturing, by an imaging device of an end-user computing device associated with an authenticating user, input from an electronic tag of a physical asset;
    capturing, by the imaging device of the end-user computing device, an image of the physical asset;
    generating, by the end-user computing device, supplemental digital data associated with the input, wherein the supplemental digital data comprises a time of the capturing the input and the image of the physical asset;
    transmitting, by the end-user computing device and to an authentication and digital assets server, the input and the supplemental digital data;
    receiving, by the end-user computing device and from the authentication and digital assets server, authentication results for the physical asset, wherein the authentication results are based upon determining that the capturing the input was within a predetermined time interval, based upon determining that the physical asset is depicted in the image of the physical asset, and based upon determining that a profile of the authenticating user comprises historical interactions of the authenticating user and includes indication of one or more successful authentications of one or more physical assets in the past;
    displaying, by the end-user computing device, the authentication results;
    receiving, by the end-user computing device and from the authentication and digital assets server, one or more digital assets associated with the physical asset and receiving indication of a time window of eligibility for claiming the one or more digital assets, wherein the time window is defined by at least one of a game day during which one or more game participants associated with the physical asset are scheduled to play a game or a halftime of a currently ongoing game that the game participants associated with the physical asset are participating in; and displaying, by the end user-computing device, the one or more digital assets.

2. The method of claim 1, wherein the electronic tag comprises one of a RFID tag, a QR tag, or an NFC tag.

3. The method of claim 2, wherein the input comprises a unique identification number associated with the electronic tag.

4. The method of claim 1, wherein the input supplemental digital data comprises a location of the end-user computing device during the capturing the input.

5. The method of claim 1, wherein displaying the one or more digital assets comprises:
displaying an image of each digital asset of the one or more digital assets; and
displaying a date associated with each digital asset of the one or more digital assets.

6. The method of claim 1, wherein a first digital asset of the one or more digital assets comprises an overlay.

7. The method of claim 6, further comprising:
receiving a user selection of the first digital asset;
capturing, via the imaging device, a first image;
superimposing the overlay on the first image to generate an overlaid image; and
transmitting the overlaid image to a social-media platform.

8. The method of claim 6, further comprising:
generating, by the end-user computing device, asset interaction event data associated with the first digital asset; and
transmitting, by the end-user computing device and to the authentication and digital assets server, the asset interaction event data.

9. The method of claim 8, further comprising:
receiving, by the end-user computing device and from the authentication and digital assets server, data for one or more additional assets; and
displaying, by the end-user computing device, the data for one or more additional assets.

10. The method of claim 9, wherein the one or more additional assets comprise a physical asset, and the data for one or more additional assets comprises a location where a user may retrieve the physical asset.

11. An apparatus comprising:
one or more processors;
memory storing computer-readable instructions that, when executed by the one or more processors, cause the apparatus to:
capture input from an electronic tag of a physical asset;
capture an image of the physical asset;
generate supplemental digital data associated with the input, wherein the supplemental digital data comprises a time of the capturing the input, a location of the apparatus during the capturing the input, and the image of the physical asset;
transmit, to an authentication and digital assets server, the input and the supplemental digital data;
receive, from the authentication and digital assets server, authentication results for the physical asset, wherein the authentication results are based upon determining that the capturing the input was within a predetermined time interval, based upon determining that the physical asset is depicted in the image of the physical asset, and based upon determining that a profile of an authenticating user comprises historical interactions of the authenticating user and includes indication of one or more successful authentications of one or more physical assets in the past;
display the authentication results;
receive, from the authentication and digital assets server, one or more digital assets associated with the physical asset and receive indication of a time window of eligibility for claiming the one or more digital assets, wherein the time window is defined by at least one of a game day during which one or more game participants associated with the physical asset are scheduled to play a game or a halftime of a currently ongoing game that the game participants associated with the physical asset are participating in; and
display the one or more digital assets.

12. The apparatus of claim 11, wherein the electronic tag comprises one of a RFID tag, a QR tag, or an NFC tag, and wherein the input comprises a unique identification number associated with the electronic tag.

13. The apparatus of claim 11, wherein displaying the one or more digital assets comprises:
displaying an image of each digital asset of the one or more digital assets; and
displaying a date associated with each digital asset of the one or more digital assets.

14. The apparatus of claim 11, wherein a first digital asset of the one or more digital assets comprises an overlay, the memory storing computer-readable instructions that, when executed by the one or more processors, further cause the apparatus to:
receive user selection of the first digital asset;
capture a first image;
superimpose the overlay on the first image to generate an overlaid image; and
transmit the overlaid image to a social-media platform.

15. The apparatus of claim 14, the memory storing computer-readable instructions that, when executed by the one or more processors, further cause the apparatus to:
generate asset interaction event data associated with the first digital asset; and
transmit, to the authentication and digital assets server, the asset interaction event data.

16. The method of claim 8, further comprising:
receiving, by the end-user computing device and from the authentication and digital assets server, data for one or more additional assets, wherein the one or more additional assets comprise a physical asset; and
displaying, by the end-user computing device, the data, wherein the data comprises a location where a user may retrieve the physical asset.

17. One or more non-transitory computer-readable media storing instructions that, when executed by one or more processors of an end-user computing device, cause the end-user computing device to:
capture input from an electronic tag of a physical asset;
capture an image of the physical asset;
generate supplemental digital data associated with the input, wherein the supplemental digital data comprises a time of the capture of the input, and the image of the physical asset;

transmit, to an authentication and digital assets server, the input and the supplemental digital data;

receive, from the authentication and digital assets server, authentication results for the physical asset, wherein the authentication results are based upon determining that the capture of the input was within a predetermined time interval, based upon determining that the physical asset is depicted in the image of the physical asset, and based upon determining that a profile of an authenticating user comprises historical interactions of the authenticating user and includes indication of one or more successful authentications of one or more physical assets in the past;

display the authentication results;

receive, from the authentication and digital assets server, one or more digital assets associated with the physical asset receive indication of a time window of eligibility for claiming the one or more digital assets, wherein the time window is defined by at least one of a game day during which one or more game participants associated with the physical asset are scheduled to play a game or a halftime of a currently ongoing game that the game participants associated with the physical asset are participating in; and display the one or more digital assets.

18. The one or more non-transitory computer-readable media of claim 17, wherein the electronic tag comprises one of an RFID tag, a QR tag, or an NFC tag, wherein the input comprises a unique identification number associated with the electronic tag, and wherein the input supplemental digital data further comprises a location of the end-user computing device during the capturing the input.

* * * * *

UNITED STATES PATENT AND TRADEMARK OFFICE
CERTIFICATE OF CORRECTION

PATENT NO. : 11,509,653 B2
APPLICATION NO. : 16/129439
DATED : November 22, 2022
INVENTOR(S) : Faris et al.

It is certified that error appears in the above-identified patent and that said Letters Patent is hereby corrected as shown below:

On the Title Page

Page 2, Column 2, item (56) Other Publications, Line 36:
Delete "Phsyical" and insert --Physical-- therefor Signed and Sealed this
Eleventh Day of July, 2023

Katherine Kelly Vidal
*Director of the United States Patent and Trademark Office*